United States Patent
Chen et al.

(10) Patent No.: US 12,224,665 B2
(45) Date of Patent: Feb. 11, 2025

(54) POWER CONVERSION SYSTEM AND CONTROL METHOD

(71) Applicants: The Trustees of Princeton University, Princeton, NJ (US); Halo Microelectronics International, Campbell, CA (US)

(72) Inventors: Minjie Chen, Princeton, NJ (US); Songnan Yang, Frisco, TX (US)

(73) Assignees: The Trustees of Princeton University, Princeton, NJ (US); Halo Microelectronics International, Campbell, CA (US)

( * ) Notice: Subject to any disclaimer, the term of this patent is extended or adjusted under 35 U.S.C. 154(b) by 255 days.

(21) Appl. No.: 18/046,977

(22) Filed: Oct. 17, 2022

(65) Prior Publication Data
US 2024/0079954 A1 Mar. 7, 2024

Related U.S. Application Data

(60) Provisional application No. 63/374,398, filed on Sep. 2, 2022.

(51) Int. Cl.
*H02M 3/07* (2006.01)
*H02M 1/00* (2006.01)

(52) U.S. Cl.
CPC ........... *H02M 3/07* (2013.01); *H02M 1/0083* (2021.05)

(58) Field of Classification Search
CPC .............................. H02M 3/07; H02M 1/0083
USPC .......................................................... 323/217
See application file for complete search history.

(56) References Cited

U.S. PATENT DOCUMENTS

| | | | |
|---|---|---|---|
| 2013/0003424 A1* | 1/2013 | Song | H02M 3/33584 363/21.04 |
| 2014/0376287 A1* | 12/2014 | Narimani | H02M 3/07 363/60 |
| 2016/0329811 A1* | 11/2016 | Du | H02M 1/14 |
| 2020/0212806 A1* | 7/2020 | Levi | H02M 3/33507 |

\* cited by examiner

*Primary Examiner* — Yemane Mehari
(74) *Attorney, Agent, or Firm* — AP3 Law Firm PLLC

(57) ABSTRACT

A power conversion system includes one or more switched capacitor input cells connected between an input dc source and a plurality of interleaved multilevel voltage rails, one or more inductor links connected to the plurality of interleaved multilevel voltage rails, and one or more output cells, wherein each output cell is connected to an output load and all of the plurality of interleaved multilevel voltage rails through a corresponding inductor link.

20 Claims, 27 Drawing Sheets

POWER CONVERSION SYSTEM AND CONTROL METHOD

PRIORITY

This application claims the benefit of U.S. Provisional Application No. 63/374,398, filed on Sep. 2, 2022, entitled "Power Conversion System and Control Method," which application is hereby incorporated herein by reference.

TECHNICAL FIELD

The circuits and techniques described herein relate generally to power conversion systems and more particularly to power conversion systems having a high voltage conversion ratio and multiple separately regulated output voltage rails. This power conversion system is particularly suitable to power microprocessors in computers, servers, data centers, telecom base stations, and consumer electronics.

BACKGROUND

As technologies further advance, next generation computing such as artificial intelligence (AI) has emerged as an effective alternative to further improve the capability of the computing technology. AI based next generation computing systems exhibit human intelligence such as perceiving, learning, reasoning and solving problems. The AI based next generation computing systems may be implemented as graphical processing units (GPU). The graphical processing units can achieve performance gains through parallel computations. As the computing power of the graphical processing units has increased, the demand for electrical power has continued to rise. In order to reduce power losses in a next generation computing load (e.g., graphical processing units), a low supply voltage (e.g., a sub-1 V) is used to power the graphical processing units. The low supply voltage is converted from a 48-Volt distribution bus.

The advent of next generation computing systems has resulted in a need for dc/dc converters having a very low output voltage (e.g., Vo is less than 2 V), a high output current (e.g., Io is greater than 50 A) and a high voltage conversion ratio (e.g., a ratio of VIN to Vo is greater than 10:1). Power converters that can provide a low output (e.g., Vo is less than 2 V) regulated at high bandwidth, while drawing energy from a higher, wide-ranging input voltage (e.g., VIN is in a range from about 40 V to about 60 V) are particularly useful for supporting high performance microprocessors. In future chiplet-based systems, many high current electronic loads are placed in close proximity to each other. The size, cost, and performance advantages of integration make it desirable to have modular and miniaturized multi-output dc/dc converters that can be easily scaled in size for a variety of applications with different voltage and current needs.

One common approach is the use of a switching mode power converter in which energy is transferred from a converter input to a converter output with the help of magnetic elements such as inductors or coupled inductors. Such magnetics-based topologies include synchronous buck converters, interleaved synchronous buck converters, three-level buck converters, and the like. This type of converters can be designed to achieve a regulated output voltage from a variable input voltage with applying a high-bandwidth control scheme to the output. These conventional buck converters, however, are not suitable for high input voltage applications because the switches of the conventional buck converter must handle both high voltage stress and high current stress. In addition, in the high voltage applications (e.g., 48 V), the inductors are also usually large.

A power conversion system having a two-stage intermediate bus architecture (IBA) is popular solution for high voltage conversion ratio and high output current applications. The two-stage IBA power conversion system comprises a first power conversion stage and a second power conversion stage connected in cascade between an input power source and a load. The first power conversion stage is usually implemented as a dc/dc converter configured to convert a high voltage (e.g., 48 V) to a lower voltage (e.g., 12 V, 6 V, 4 V or 2 V) without regulation. The first power conversion stage is usually implemented as a transformer-based topology or a switched capacitor topology. The second power conversion stage is usually implemented as a multi-phase buck converter. The switches of the first power conversion stage and the second power conversion stage do not need to handle both high voltage stress and high current stress. The two power conversion stages are usually linked by a large dc decoupling capacitor.

In some high current and high voltage conversion ratio applications, it would be desirable to have a power conversion system capable of achieving high efficiency under a variety of operating conditions.

SUMMARY

These and other problems are generally solved or circumvented, and technical advantages are generally achieved, by preferred embodiments of the present disclosure which provide a power conversion system having a high voltage conversion ratio and multiple separately regulated output voltage rails.

In accordance with an embodiment, a power conversion system comprises one or more switched capacitor input cells connected between an input dc source and a plurality of interleaved multilevel voltage rails, one or more inductor links connected to the plurality of interleaved multilevel voltage rails, and one or more output cells, wherein each output cell is connected to an output load and all of the plurality of interleaved multilevel voltage rails through a corresponding inductor link.

In accordance with another embodiment, a method comprises configuring one or more switched capacitor input cells to generate a plurality of voltage pulses on a plurality of interleaved multilevel voltage rails, configuring one or more inductor links to be connected to the plurality of interleaved multilevel voltage rails, and configuring one or more output cells to be connected between the plurality of interleaved multilevel voltage rails and a plurality of load, wherein each output cell is connected to an output load and all of the plurality of interleaved multilevel voltage rails through a corresponding inductor link.

In accordance with yet another embodiment, a system comprises one or more input cells connected to an input dc source and one or more interleaved multilevel voltage rails, one or more inductor links connected to the one or more interleaved multilevel voltage rails, and one or more switched capacitor output cells, wherein each switched capacitor output cell is connected to an output load and all of the one or more interleaved multilevel voltage rails through the one or more inductor links.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

The present disclosure will be described with respect to preferred embodiments in a specific context, namely a power conversion system having a high voltage conversion ratio and multiple separately regulated output voltage rails. The invention may also be applied, however, to a variety of power conversion systems. Hereinafter, various embodiments will be explained in detail with reference to the accompanying drawings.

Figure 1:
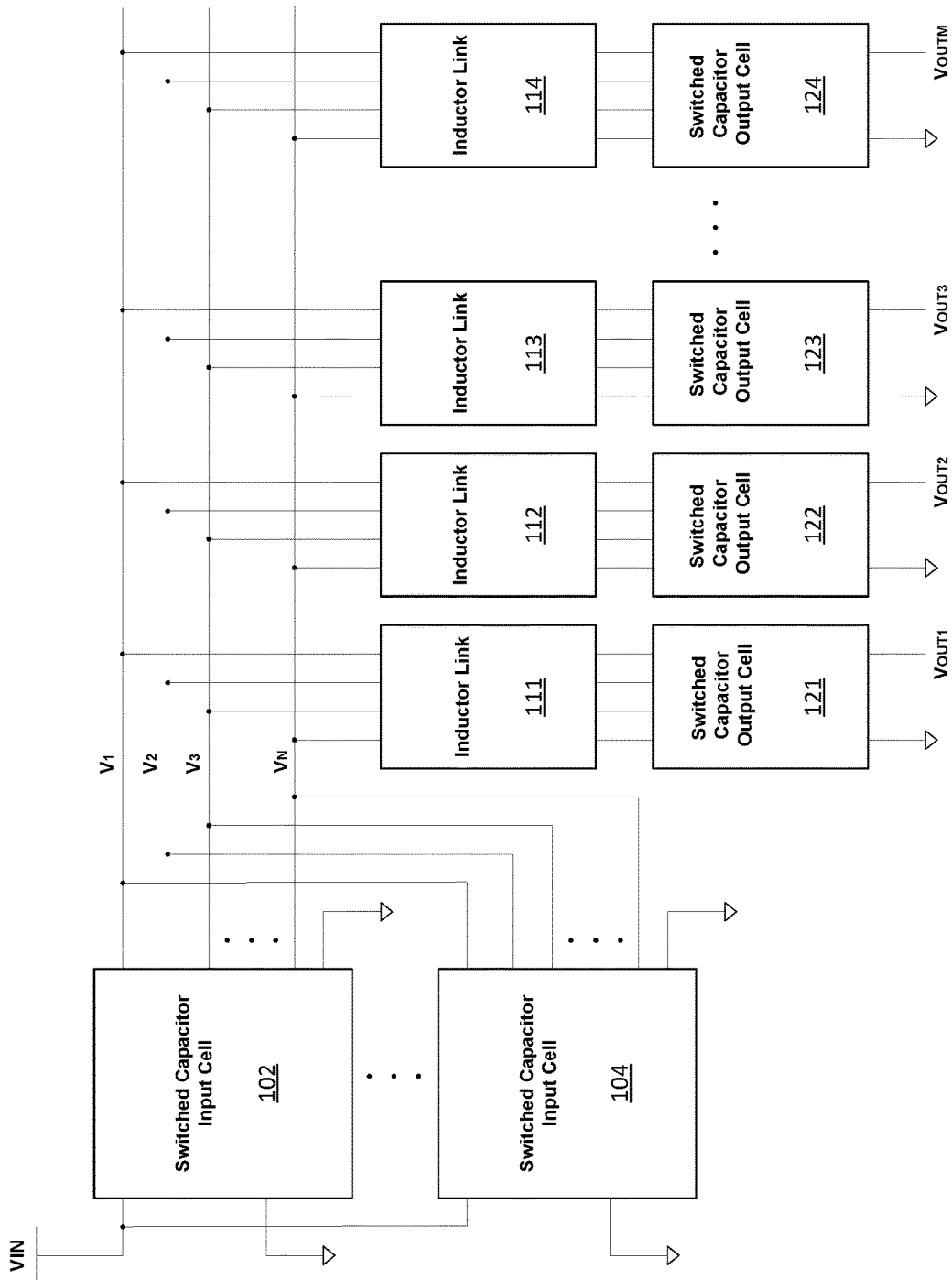
FIG. 1 illustrates a block diagram of an inductor-link power conversion system with multiple outputs in accordance with various embodiments of the present disclosure.

FIG. 1 illustrates a block diagram of an inductor-link power conversion system with multiple outputs in accordance with various embodiments of the present disclosure. The power conversion system shown in FIG. 1 comprises a plurality of switched capacitor input cells. The inputs of the plurality of switched capacitor input cells are connected to an input voltage source VIN. Each switched capacitor input cell has a plurality of outputs. Each output is connected to a corresponding voltage rail of a plurality of interleaved multilevel voltage rails $V_1, V_2, V_3, \ldots, V_N$ as shown in FIG. 1.

In some embodiments, the switched capacitor input cells are implemented as switched capacitor power converters. In operation, in a first part of one switching cycle of one switched capacitor power converter, the input voltage source VIN is configured to charge at least one flying capacitor through a first group of switches of the switched capacitor power converter. In a second part of the switching cycle of the one switched capacitor power converter, the at least one flying capacitor is configured to provide power for at least one of the plurality of interleaved multilevel voltage rails through a second group of switches of the switched capacitor power converter.

Figure 13:
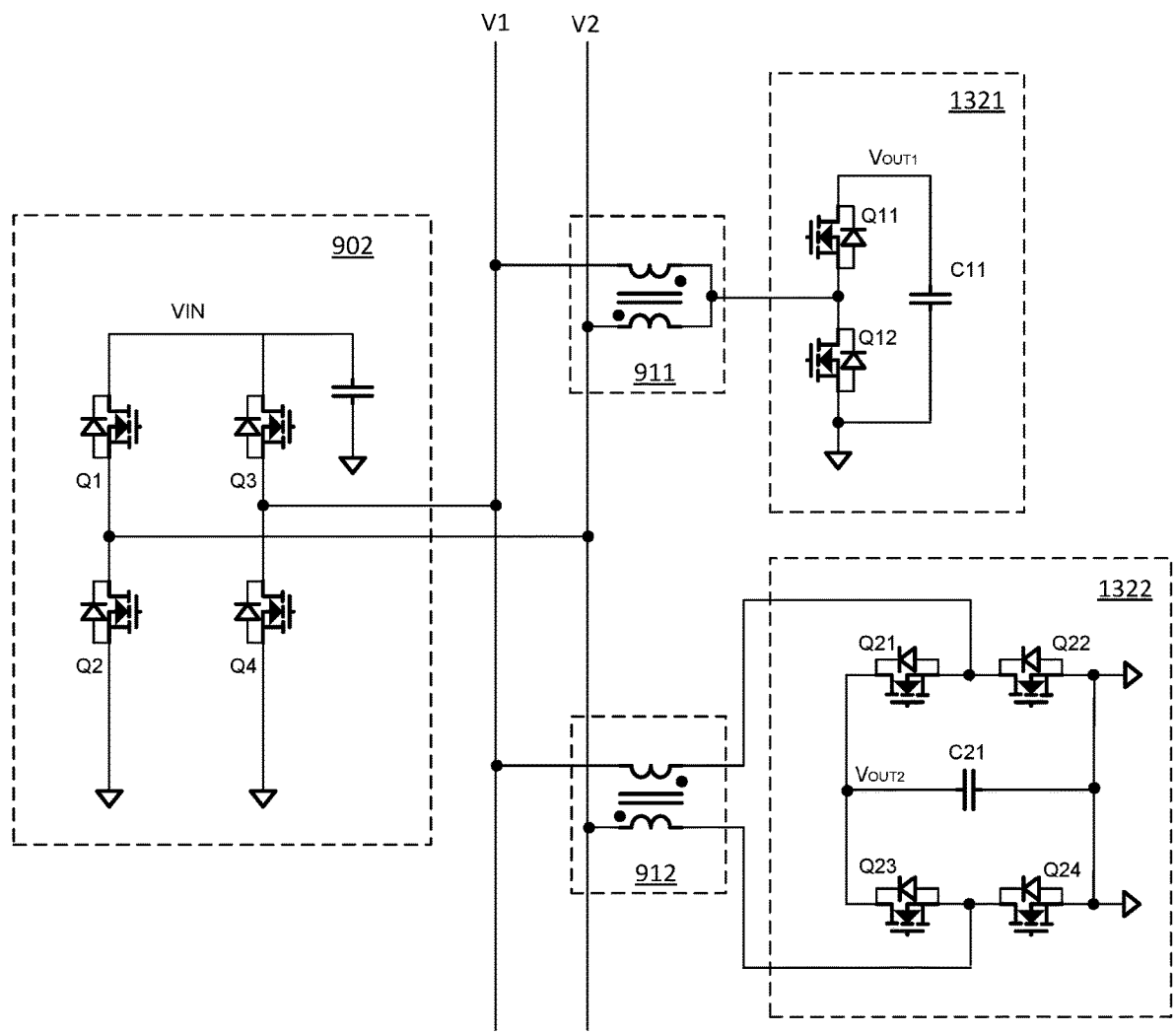
FIG. 13 illustrates a schematic diagram of the fourth implementation of the inductor-link power conversion system shown in FIG. 1 in accordance with various embodiments of the present disclosure.

It should be noted that the switched capacitor input cells are merely examples. Depending design needs, the switched capacitor input cells can be replaced by other suitable converters capable of generating interleaved multilevel voltages for the voltage rails. For example, the input cell can be implemented as a multi-phase buck converter as shown in FIG. 13.

The power conversion system shown in FIG. 1 further comprises a plurality of inductor links 111, 112, 113 and 114. As shown in FIG. 1, the plurality of interleaved multilevel voltage rails $V_1, V_2, V_3, \ldots, V_N$ is coupled to the plurality of inductor links 111, 112, 113 and 114. Each of the plurality of inductor links is coupled to all of the plurality of interleaved multilevel voltage rails. As shown in FIG. 1, the power conversion system further comprises a plurality of switched capacitor output cells 121, 122, 123 and 124. Each switched capacitor output cell has inputs connected to outputs of a corresponding inductor link. The outputs of the plurality of switched capacitor output cells form the multiple outputs of the power conversion system.

In some embodiments, the switched capacitor output cells are implemented as switched capacitor power converters. In operation, in a first part of one switching cycle of a switched capacitor power converter (output cell), an inductor link is configured to charge at least one flying capacitor through a first group of switches of the switched capacitor power converter (output cell). In a second part of the one switching cycle of the switched capacitor power converter (output cell), the at least one flying capacitor is configured to provide power for a corresponding load through a second group of switches of the switched capacitor power converter (output cell).

It should be noted that the number of the switched capacitor input cells is not necessary to be equal to the number of the switched capacitor output cells.

In some embodiments, the inductor-link power conversion system shown in FIG. 1 is employed to convert power from a 48 V single input bus to multiple low voltage outputs. The inductor-link power conversion system uses magnetic components (e.g., inductor links) as the intermediate link. The inductor-link power conversion system comprises a front-end switched capacitor stage to convert the voltage from the 48 V single input bus to multiple interleaved multi-level voltage rails (e.g., interleaved multi-level voltage rails with a peak voltage in a range from 4 V to 8 V) for power distribution. In addition, the inductor-link power conversion system uses many low voltage switched capacitor converters for voltage regulation. In comparison with traditional high conversion ratio power conversion systems, the inductor-link architecture shown in FIG. 1 moves the inductors to a higher voltage level with lower current ratings. Such a configuration helps to absorb the impact from the parasitic elements of the power distribution network (PDN) and lower the root mean square (RMS) currents in the inductors, thereby reducing power losses.

Figure 2:
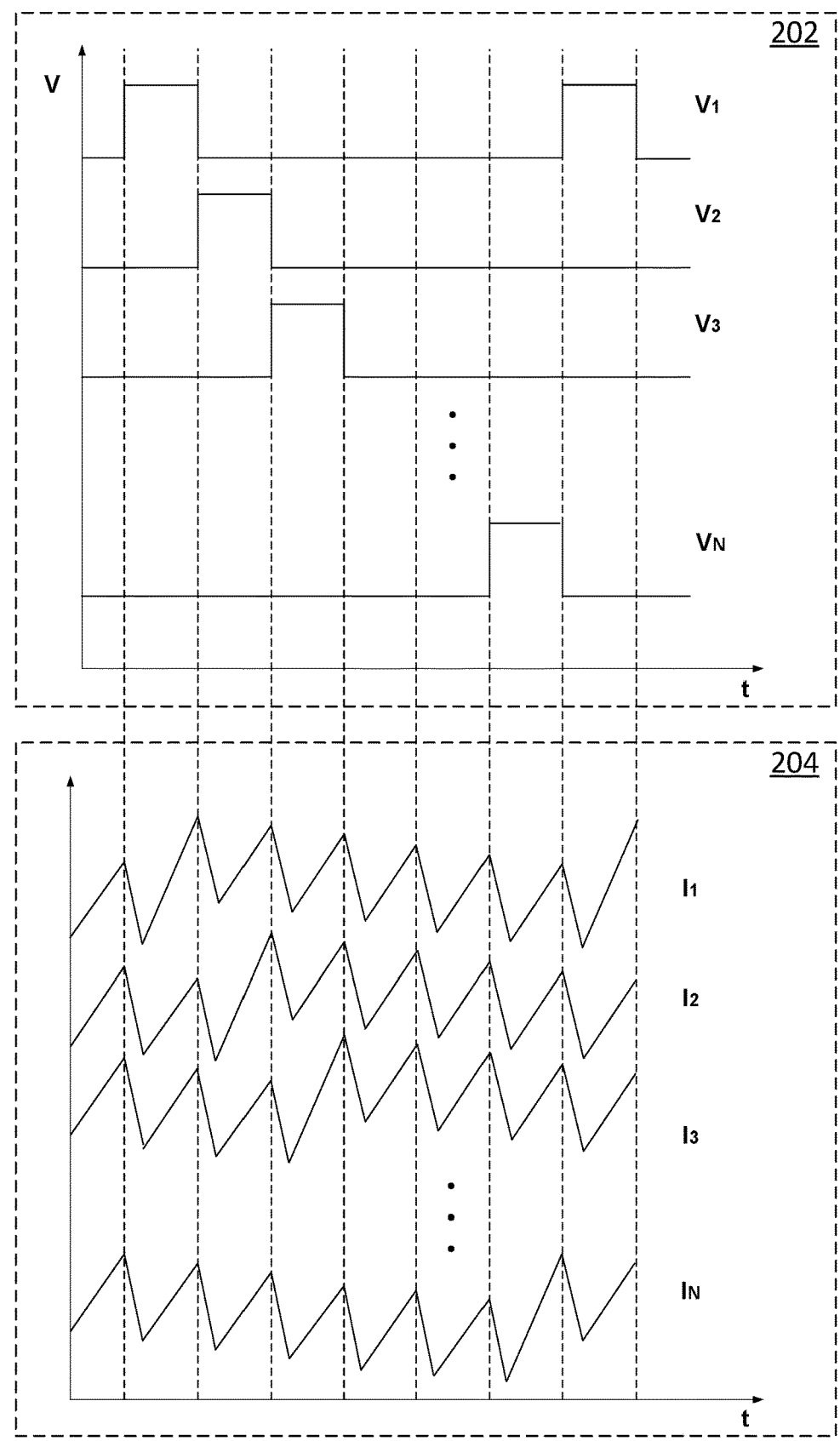
FIG. 2 illustrates various signals associated with the inductor-link power conversion system shown in FIG. 1 in accordance with various embodiments of the present disclosure.

FIG. 2 illustrates various signals associated with the inductor-link power conversion system shown in FIG. 1 in accordance with various embodiments of the present disclosure. In the dashed rectangle 202, the horizontal axis represents intervals of time. The vertical axis represents voltages on the plurality of interleaved multilevel voltage rails. Each row (e.g., the first row) illustrates the voltage on a corresponding interleaved multilevel voltage rail (e.g., the first interleaved multilevel voltage rail $V_1$). As shown in FIG. 2, in each switching cycle of the switched capacitor input cells, the voltage on each row is a voltage pulse. The voltage pulses on the plurality of interleaved multilevel voltage rails are generated in a sequential manner, and the peak voltage of the voltage pulses can be significantly lower than the input voltage of the inductor-link power conversion system.

In the dashed rectangle 204, the horizontal axis represents intervals of time. The vertical axis represents the currents flowing through the plurality of interleaved multilevel voltage rails. Each row (e.g., the first row) is the current flowing through a corresponding interleaved multilevel voltage rail (e.g., the first interleaved multilevel voltage rail $V_1$). As shown in FIG. 2, the current flowing through each of the interleaved multilevel voltage rail is also interleaved. A peak current corresponds to the end of each voltage pulse on the same voltage rail. For example, the current peak of I1 is vertically aligned with the falling edge of the voltage pulse of $V_1$ as shown in FIG. 2. In addition, the zigzag shaped current waveform between peaks indicates that coupled inductors are employed in the inductor-links.

Figure 3:
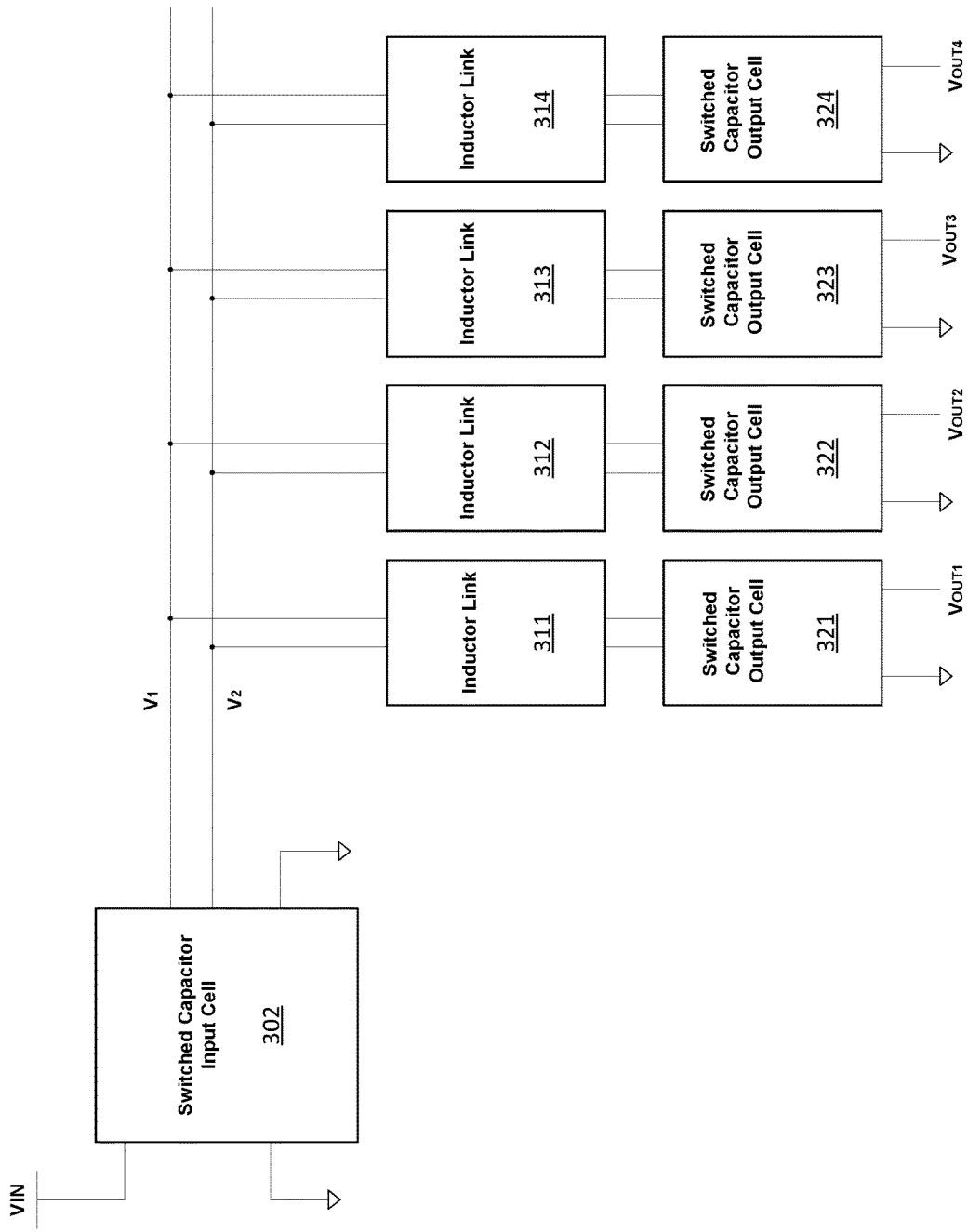
FIG. 3 illustrates a block diagram of a first implementation of the inductor-link power conversion system shown in FIG. 1 in accordance with various embodiments of the present disclosure.

FIG. 3 illustrates a block diagram of a first implementation of the inductor-link power conversion system shown in FIG. 1 in accordance with various embodiments of the present disclosure. The power conversion system shown in FIG. 3 comprises a switched capacitor input cell 302. The input of the switched capacitor input cell 302 is connected to the input voltage source VIN. The switched capacitor input cell 302 has two outputs. Each output is connected to a corresponding voltage rail of two interleaved multilevel voltage rails $V_1$ and $V_2$.

Figure 4:
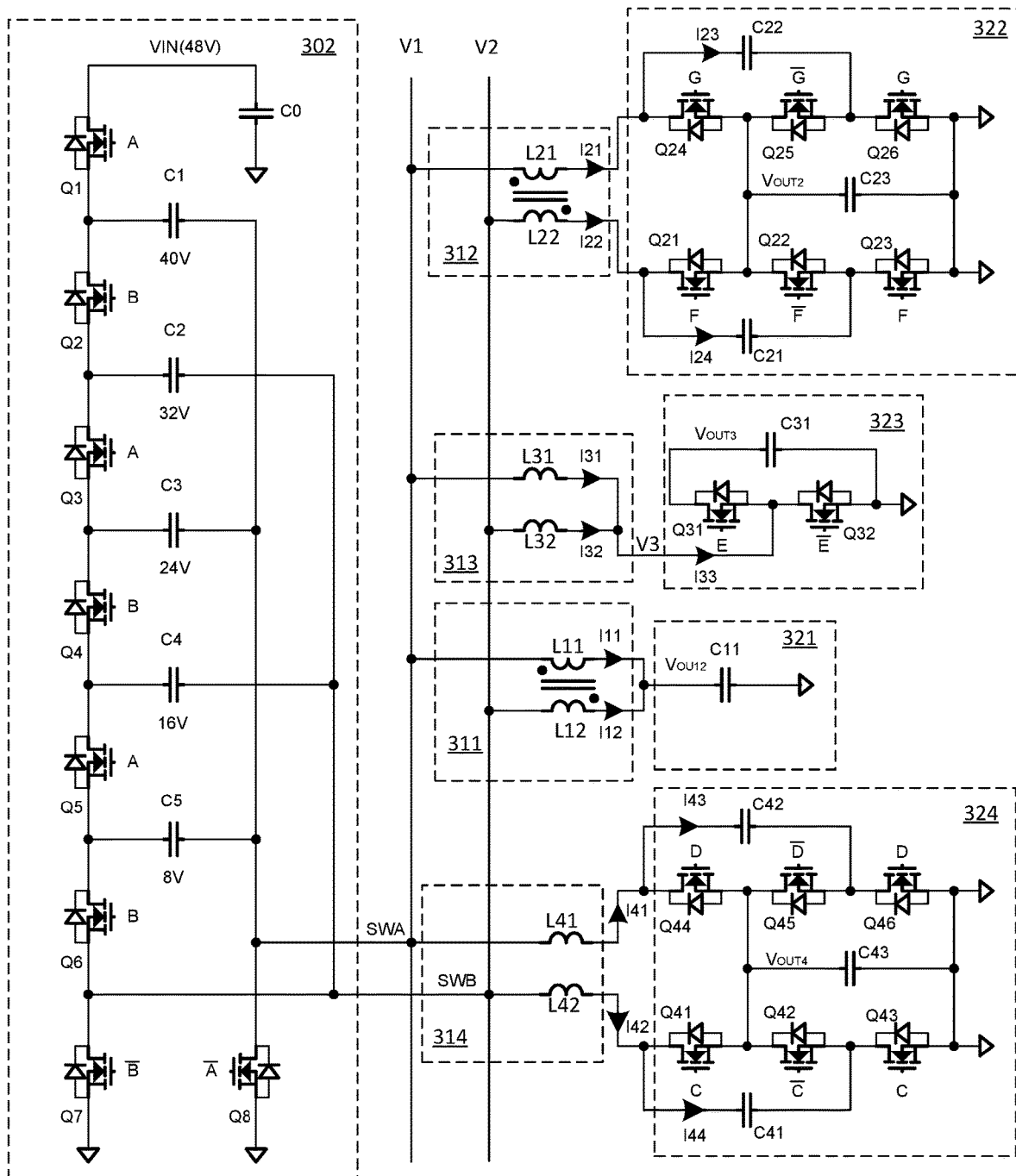
FIG. 4 illustrates a schematic diagram of the first implementation of the inductor-link power conversion system shown in FIG. 1 in accordance with various embodiments of the present disclosure.

The power conversion system shown in FIG. 3 further comprises four inductor links 311, 312, 313 and 314. As shown in FIG. 4, the two interleaved multilevel voltage rails $V_1$ and $V_2$ are coupled to the four inductor links 311, 312, 313 and 314. Each of the four inductor links 311, 312, 313 and 314 is coupled to all of the two interleaved multilevel voltage rails $V_1$ and $V_2$.

As shown in FIG. 3, the power conversion system further comprises four switched capacitor output cells 321, 322, 323 and 324. Each switched capacitor output cell (e.g., switched capacitor output cell 321) has inputs connected to outputs of a corresponding inductor link (e.g., inductor link 311). The outputs of the four switched capacitor output cells 321, 322, 323 and 324 form the multiple outputs of the power conversion system.

In some embodiments, the inductor-link power conversion system shown in FIG. 3 is employed to convert power from a 48 V single input bus to multiple low voltage outputs. The inductor-link power conversion system uses magnetic components (e.g., inductor links) as the intermediate link. The inductor-link power conversion system comprises a front-end switched capacitor stage to convert the voltage from the 48 V voltage bus to two interleaved multi-level voltage rails (e.g., interleaved multi-level voltage rails $V_1$ and $V_2$ with a peak voltage in a range from 4 V to 8 V) for power distribution. In addition, the inductor-link power conversion system uses many low voltage switched capacitor converters (e.g., switched capacitor output cells 321, 322, 323 and 324) for voltage regulation.

FIG. 4 illustrates a schematic diagram of the first implementation of the inductor-link power conversion system shown in FIG. 1 in accordance with various embodiments of the present disclosure. The power conversion system comprises a switched capacitor input cell 302, a first inductor link 311, a second inductor link 312, a third inductor link 313, a fourth inductor link 314, a first output cell 321, a second output cell 322, a third output cell 323 and a fourth output cell 324.

As shown in FIG. 4, the input of the switched capacitor input cell 302 is an input voltage bus (e.g., a 48 V voltage bus). A first output of the switched capacitor input cell 302 is connected to a first voltage rail $V_1$. A second output of the switched capacitor input cell 302 is connected to a second voltage rail $V_2$.

As shown in FIG. 4, the two inputs of the first inductor link 311 are connected to the two voltage rails $V_1$ and $V_2$, respectively. The output of the first inductor link 311 is connected to the first output cell 321. The two inputs of the second inductor link 312 are connected to the two voltage rails $V_1$ and $V_2$, respectively. The outputs of the second inductor link 312 are connected to the second output cell 322. The two inputs of the third inductor link 313 are connected to the two voltage rails $V_1$ and $V_2$, respectively. The output of the third inductor link 313 is connected to the third output cell 323. The two inputs of the fourth inductor link 314 are connected to the two voltage rails $V_1$ and $V_2$, respectively. The outputs of the fourth inductor link 314 are connected to the fourth output cell 324.

As shown in FIG. 4, the switched capacitor input cell 302 is implemented as a Dickson power converter. The Dickson power converter comprises switches Q1, Q2, Q3, Q4, Q5, Q6, Q7 and Q8, and capacitors C0, C1, C2, C3, C4 and C5. The structure of the Dickson power converter is well known in the art, and hence is not discussed in further detail herein.

The Dickson power converter has two output nodes, namely SWA and SWB as shown in FIG. 4. The voltage on the node SWA is a plurality of first voltage pulses. In some embodiments, the amplitude of the first voltage pulses is equal to one sixth of the input voltage VIN. The voltage on the node SWB is a plurality of second voltage pulses. In some embodiments, the amplitude of the second voltage pulses is equal to one sixth of the input voltage VIN. In one switching cycle of the Dickson power converter, there is a 180-degree phase shift between a first voltage pulse and a second voltage pulse. The voltages of the flying capacitors C1, C2, C3, C4 and C5 in the Dickson power converter are 40 V, 32 V, 24 V, 16 V and 8 V, respectively as shown in FIG. 4.

As shown in FIG. 4, the first inductor link 311 comprises two windings L11 and L12. In some embodiments, the two windings L11 and L12 are magnetically coupled to each other to form a first coupled inductor as shown in FIG. 4. The second inductor link 312 comprises two windings L21 and L22. In some embodiments, the two windings L21 and L22 are magnetically coupled to each other to form a second coupled inductor as shown in FIG. 4. The third inductor link 313 comprises two windings L31 and L32. In some embodiments, the two windings L31 and L32 are magnetically coupled to each other to form a third coupled inductor as shown in FIG. 4. The fourth inductor link 314 comprises two windings L41 and L42. In some embodiments, the two windings L41 and L42 are two separate inductors as shown in FIG. 4. It should be noted that depending on different design needs, the coupled inductor (e.g., coupled inductor formed by L21 and L22) shown in FIG. 4 can be replaced by two separate inductors. On the other hand, the separate inductors (e.g., inductors L41 and L42) shown in FIG. 4 can be replaced by a coupled inductor.

The first output cell 321 comprises a capacitor C11. In operation, the first output cell 321 is configured to generate a regulated output voltage of 1.5 V. The 1.5 V output is generated by directly filtering the two pulsed voltage rails (e.g., 8-V voltage pulses). The duty cycle D of the switched capacitor input cell 302 is controlled such that the output is regulated at 1.5 V. The output voltage of the first output cell is equal to VIN×D/6. In some embodiments, VIN is equal to 48 V. The output voltage $V_{OUT1}$ is equal to 1.5 V. As a result, D is equal to 0.1875.

It should be noted that the first output cell 321 is not a switched capacitor converter. In various embodiments, the output cell can be implemented as a suitable switched capacitor converter. However, depending on design needs, the output cell may be implemented as other suitable power circuits such as the circuit show in FIG. 4.

The second output cell 322 is implemented as a switched capacitor converter comprising switches Q21, Q22, Q23, Q24, Q25 and Q26, and capacitors C21, C22 and C23. In operation, the second output cell 322 is configured to generate a regulated output voltage of 1.2 V. The switched capacitor converter is configured to operate at twice the switching frequency of the Dickson power converter.

The third output cell 323 is implemented as a single-phase boost circuit comprising switches Q31 and Q32, and capacitor C31. In operation, the third output cell 323 is configured to generate a regulated output voltage of 1.8 V. The third output cell 323 is configured to operate at triple the switching frequency of the Dickson power converter. The voltage is boosted from 1.5 V to 1.8 V.

The fourth output cell 324 is implemented as a switched capacitor converter comprising switches Q41, Q42, Q43, Q44, Q45 and Q46, and capacitors C41, C42 and C43. The fourth output cell 324 is configured to generate a regulated output voltage of 1.0 V. In operation, the switched capacitor converter is configured to operate at a frequency equal to four times the switching frequency of the Dickson power converter.

Figure 5:
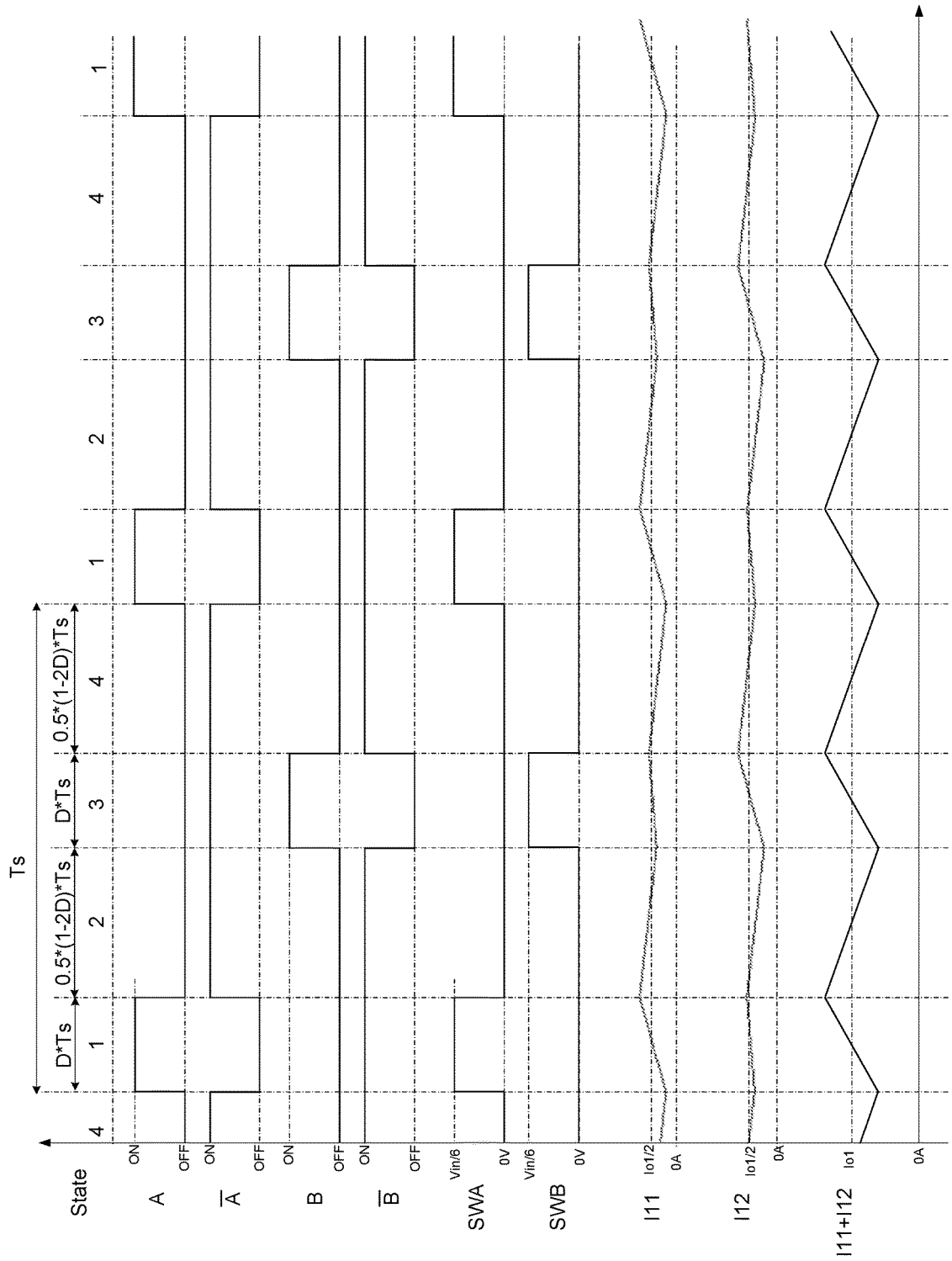
FIG. 5 illustrates various signals associated with the first output ($V_{OUT1}$) of the power conversion system shown in FIG. 4 in accordance with various embodiments of the present disclosure.

FIG. 5 illustrates various signals associated with the first output ($V_{OUT1}$) of the power conversion system shown in FIG. 4 in accordance with various embodiments of the present disclosure. The horizontal axis represents intervals of time. There are nine rows. The first row represents the gate drive signals of Q1, Q3 and Q5. The second row represents the gate drive signal of Q8. The third row represents the gate drive signals of Q2, Q4 and Q6. The fourth row represents the gate drive signal of Q7. The fifth row represents the voltage on node SWA (i.e., the first interleaved multilevel voltage rail $V_1$). The sixth row represents the voltage on node SWB (i.e., the second interleaved multilevel voltage rail $V_2$). The seventh row represents the current flowing through L11 winding of the coupled inductor. The eighth row represents the current flowing through L12 winding of the coupled inductor. The ninth row represents the sum of the current flowing through L11 winding and the current flowing through L12 winding.

As shown in FIG. 5, in one switching period ($T_S$) of the Dickson power converter, there is a 180-degree phase shift between the gate drive signal A of Q1, Q3 and Q5, and the gate drive signal B of Q2, Q4 and Q6. The gate drive signal $\overline{A}$ of Q8 and the gate drive signal A of Q1, Q3 and Q5 are two complementary signals. The gate drive signal A is of a duty cycle D as shown in FIG. 5. Likewise, the gate drive signal $\overline{B}$ of Q7 and the gate drive signal B of Q2, Q4 and Q6 are two complementary signals. The gate drive signal B is of a duty cycle D as shown in FIG. 5. The voltage on the node SWA is a plurality of first voltage pulses. The voltage on the node SWB is a plurality of second voltage pulses. In one switching cycle $T_S$, there is a 180-degree phase shift between a first voltage pulse and a second voltage pulse.

As shown in FIG. 5, the primary upslope of the current flowing through L11 winding is in phase with the voltage on SWA. The primary upslope of the current flowing through L12 winding is in phase with the voltage on SWB. Due to the nature of coupled inductors, a secondary upslope can be observed on the current flowing through L11 winding, which is in phase with the voltage pulse on SWB. Similarly, a secondary upslope can be observed on the current flowing through L12 winding, which is in phase with the voltage pulse on SWA. The implementation of the coupled inductor (L11 and L12 shown in FIG. 4) reduces the current ripple on the inductor-link and allows a faster transient response at the same time. The sum of the current flowing through L11 winding and the current flowing through L12 winding has a switching period equal to one-half of $T_S$ as shown in FIG. 5.

Figure 6:
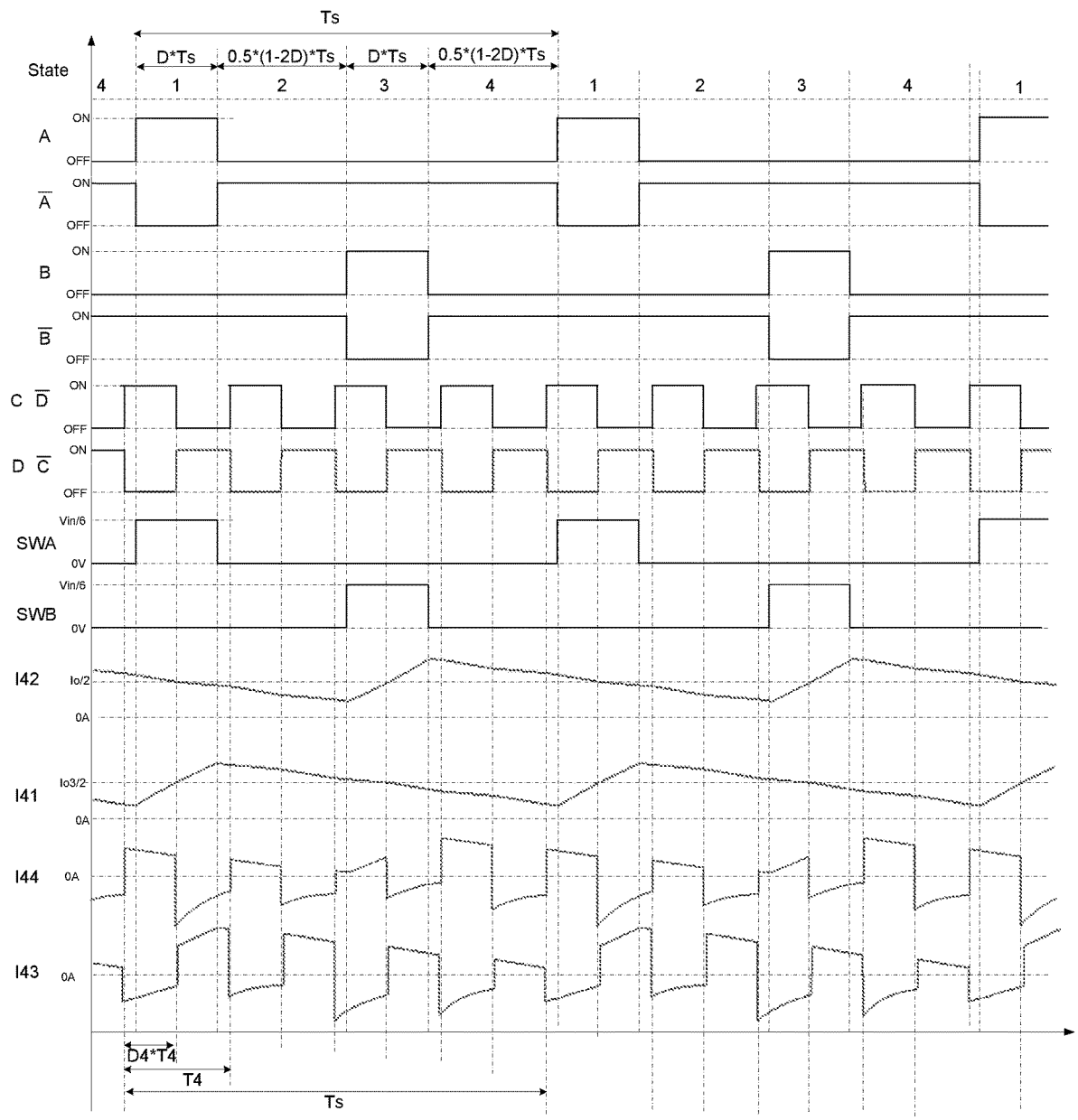
FIG. 6 illustrates various signals associated with the fourth output ($V_{OUT4}$) of the power conversion system shown in FIG. 4 in accordance with various embodiments of the present disclosure.

FIG. 6 illustrates various signals associated with the fourth output ($V_{OUT4}$) of the power conversion system shown in FIG. 4 in accordance with various embodiments of the present disclosure. The horizontal axis represents intervals of time. There are twelve rows. The first row represents the gate drive signals of Q1, Q3 and Q5. The second row represents the gate drive signal of Q8. The third row represents the gate drive signals of Q2, Q4 and Q6. The fourth row represents the gate drive signal of Q7. The fifth row represents the gate drive signals of Q41, Q43 and Q45. The sixth row represents the gate drive signals of Q42, Q44 and Q46. The seventh row represents the voltage on node SWA (i.e., the first interleaved multilevel voltage rail $V_1$). The eighth row represents the voltage on node SWB (i.e., the second interleaved multilevel voltage rail $V_2$). The ninth row represents the current flowing through L42. The tenth row represents the current flowing through L41. The eleventh row represents the current (I44) flowing through C41. The twelfth row represents the current (I43) flowing through C42.

As shown in FIG. 6, in one switching period ($T_S$) of the Dickson power converter, there is a 180-degree phase shift between the gate drive signal A of Q1, Q3 and Q5, and the gate drive signal B of Q2, Q4 and Q6. The gate drive signal $\overline{A}$ of Q8 and the gate drive signal A of Q1, Q3 and Q5 are two complementary signals. Likewise, the gate drive signal $\overline{B}$ of Q7 and the gate drive signal B of Q2, Q4 and Q6 are two complementary signals. The voltage on the node SWA is a plurality of first voltage pulses. The voltage on the node SWB is a plurality of second voltage pulses. In one switching cycle $T_S$, there is a 180-degree phase shift between a first voltage pulse and a second voltage pulse.

The gate drive signals (C and $\overline{D}$) of Q41, Q43 and Q45 and the gate drive signals (D and $\overline{C}$) of Q42, Q44 and Q46 are configured to operate at a frequency equal to four times the switching frequency of the Dickson power converter. The duty cycle is D4 as shown in FIG. 6. The switching period is T4, which is one fourth of $T_S$.

As shown in FIG. 6, the upslope of the current flowing through L41 winding is in phase with the voltage on SWA. The upslope of the current flowing through L42 winding is in phase with the voltage on SWB. Given that the switching frequency of the fourth output cell 324 is equal to the switching frequency of the Dickson input cell 302 multiplied by an even integer, the current flowing through the winding L41 is identical to the current flowing through winding L42 with a 180-degree phase shift.

As shown in FIG. 6, the current (I44) entering into flying capacitor C41 follows the current (I42) flowing through winding L42 when it is being charged. Similarly, the current (I43) entering into flying capacitor C42 follows the current (I41) flowing through winding L41 when it is being charged. As shown in FIG. 6, the currents I42/I41 flowing through windings L42/L41 rise and fall with a period of $T_S$. Since the fourth output cell 324 is operating at a higher frequency than the Dickson input cell 302, the flying capacitors C41/C42 are not always being charged by the same current. As a result, the voltages across the fly capacitors C41/C42 fluctuate between switching cycles of the fourth output cell 324. This leads to different discharging currents when the flying capacitors C41/C42 are connected in parallel with the output capacitor, and eventually this causes ripple on the 1 V output voltage. This ripple can be reduced by adjusting the conduction time of the switches in the fourth output cell 324 according to the current distribution within one switching cycle of the Dickson power converter (input cell 302) such that the flying capacitors C41/C42 are charged to the same voltage during each charging cycle.

The switched capacitor circuit in the fourth output cell 324 offers a voltage conversion ratio of 1/(2-D4). When the duty cycle D4 is equal to 0.5, the voltage conversion ratio (a ratio of the output voltage to the input voltage of the fourth output cell 324) is 1:1.5. As discussed above, the 1.5-V output voltage is achieved by directly filtering the output of the inductor link 311. After the down conversion is applied by the fourth output cell 324, the output voltage of the fourth output is regulated at a voltage level equal to 1 V.

Figure 7:
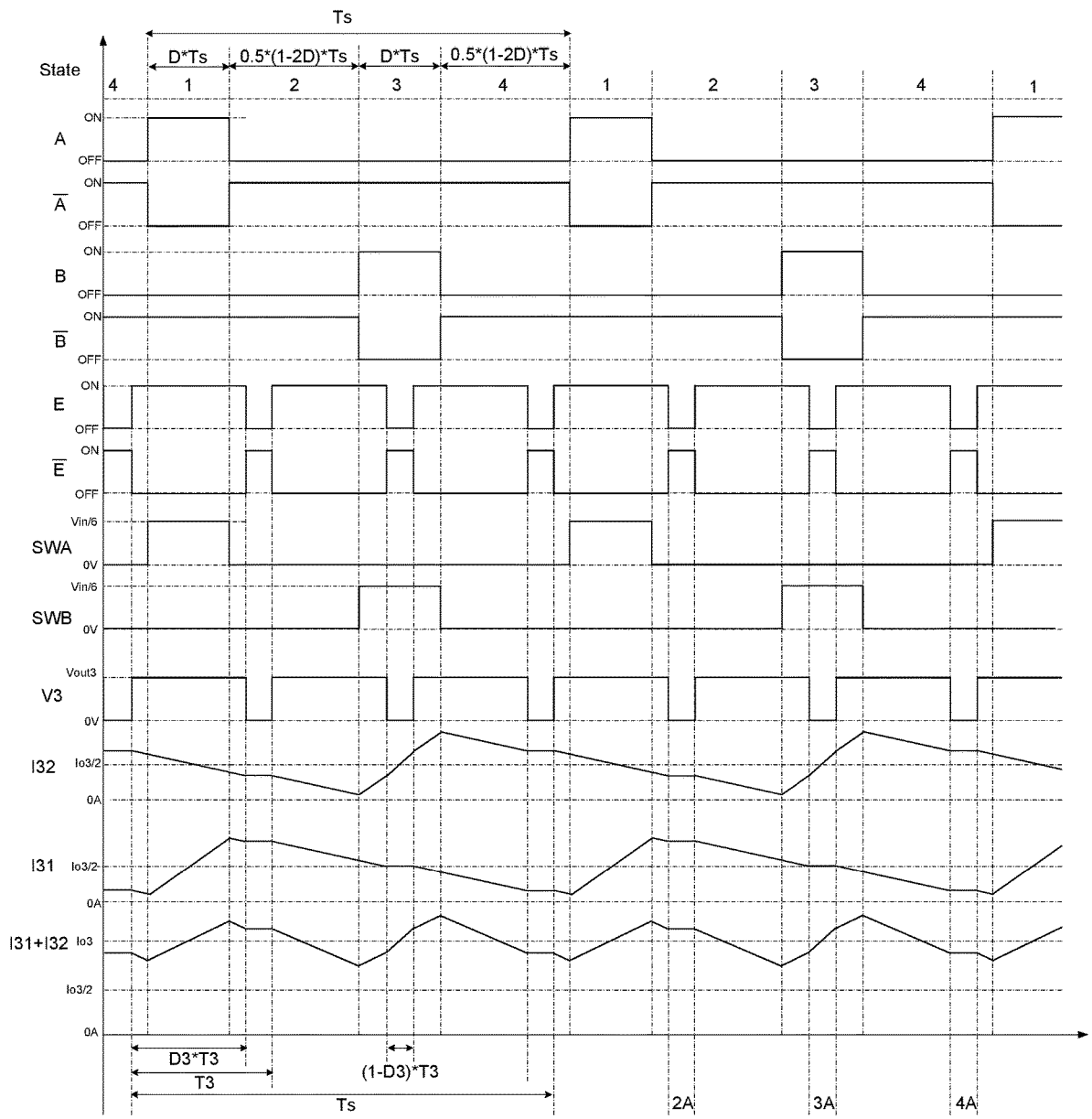
FIG. 7 illustrates various signals associated with the third output ($V_{OUT3}$) of the power conversion system shown in FIG. 4 in accordance with various embodiments of the present disclosure.

FIG. 7 illustrates various signals associated with the third output ($V_{OUT3}$) of the power conversion system shown in FIG. 4 in accordance with various embodiments of the present disclosure. The horizontal axis represents intervals of time. There are twelve rows. The first row represents the gate drive signals of Q1, Q3 and Q5. The second row represents the gate drive signal of Q8. The third row represents the gate drive signals of Q2, Q4 and Q6. The fourth row represents the gate drive signal of Q7. The fifth row represents the gate drive signal of Q31. The sixth row represents the gate drive signal of Q32. The seventh row represents the voltage on node SWA (i.e., the first interleaved multilevel voltage rail $V_1$). The eighth row represents the voltage on node SWB (i.e., the second interleaved multilevel voltage rail $V_2$). The ninth row represents the voltage (V3) on a common node of L31 and L32. The tenth row represents the current flowing through L32. The eleventh row represents the current flowing through L31. The twelfth row represents the sum of the current flowing through L31 and the current flowing through L32.

As shown in FIG. 7, in one switching period ($T_S$) of the Dickson power converter, there is a 180-degree phase shift between the gate drive signal A of Q1, Q3 and Q5, and the gate drive signal B of Q2, Q4 and Q6. The gate drive signal $\overline{A}$ of Q8 and the gate drive signal A of Q1, Q3 and Q5 are two complementary signals. Likewise, the gate drive signal $\overline{B}$ of Q7 and the gate drive signal B of Q2, Q4 and Q6 are two complementary signals. The voltage on the node SWA is a plurality of first voltage pulses. The voltage on the node SWB is a plurality of second voltage pulses. In one switching cycle $T_S$, there is a 180-degree phase shift between a first voltage pulse and a second voltage pulse.

The gate drive signal E of Q31 and the gate drive signal $\overline{E}$ of Q32 are configured to operate at a frequency equal to three times the switching frequency of the Dickson power converter (the input cell 302). The duty cycle of the gate drive signal E is D3 as shown in FIG. 7. For a 1.8 V output voltage of $V_{OUT3}$, D3 is approximately equal to 0.83 in consideration with the following voltage relationship ($V_{OUT3}$ is equal to $V_{OUT1}$/D3) and the output voltage $V_{OUT1}$ ($V_{OUT1}$ is equal to 1.5 V by directly filtering the output of inductor link 311). The switching period is T3, which is one third of $T_S$.

As shown in FIG. 7, the upslope of the current flowing through L31 winding is in phase with the voltage on SWA. The upslope of the current flowing through L32 winding is in phase with the voltage on SWB. Although the average currents flowing through the two windings (L31 and L32) are the same, the currents flowing through winding L31 and winding L32 are no longer identical because the switching frequency of the third output cell 323 is equal to the switching frequency of the Dickson power converter (the input cell 302) multiplied by an odd integer greater than one. This is different from the situation in which the switching frequency of the output cell is equal to the switching frequency of the Dickson power converter multiplied by an even integer.

Figure 8:
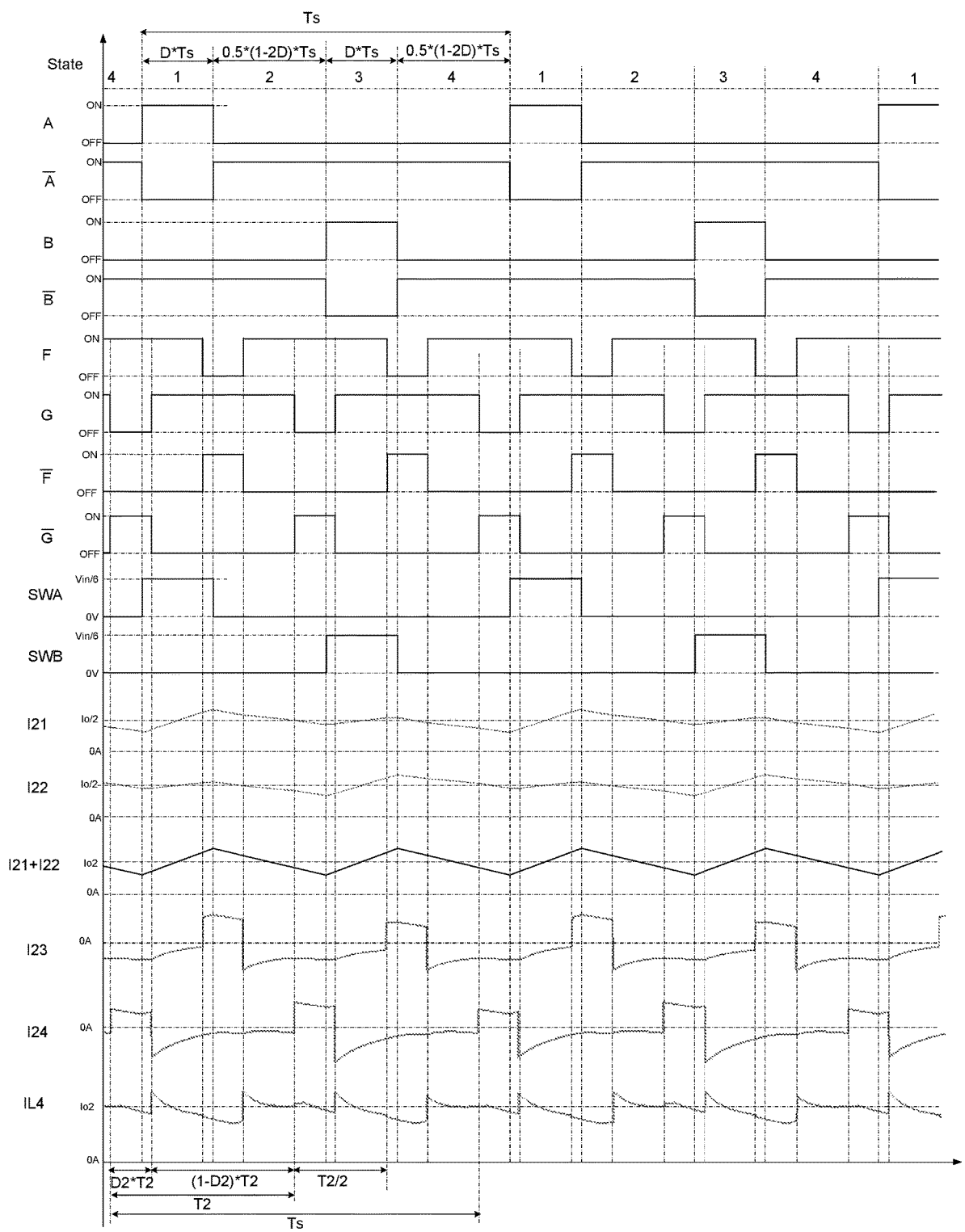
FIG. 8 illustrates various signals associated with the second output ($V_{OUT2}$) of the power conversion system shown in FIG. 4 in accordance with various embodiments of the present disclosure.

FIG. 8 illustrates various signals associated with the second output ($V_{OUT2}$) of the power conversion system shown in FIG. 4 in accordance with various embodiments of the present disclosure. The horizontal axis represents intervals of time. There are sixteenth rows. The first row represents the gate drive signals of Q1, Q3 and Q5. The second row represents the gate drive signal of Q8. The third row represents the gate drive signals of Q2, Q4 and Q6. The fourth row represents the gate drive signal of Q7. The fifth row represents the gate drive signals of Q21 and Q23. The sixth row represents the gate drive signals of Q24 and Q26. The seventh row represents the gate drive signal of Q22. The eighth row represents the gate drive signal of Q25. The ninth row represents the voltage on node SWA (i.e., the first interleaved multilevel voltage rail $V_1$). The tenth row represents the voltage on node SWB (i.e., the second interleaved multilevel voltage rail $V_2$). The eleventh row represents the current flowing through L21. The twelfth row represents the current flowing through L22. The thirteenth row represents the sum of the current flowing through L21 and the current flowing through L22. The fourteenth row represents the current (I23) flowing through C22. The twelfth row represents the current (I24) flowing through C21. The sixteenth row represents the current (IL4) flowing into a load connected to the second output.

As shown in FIG. 8, in one switching period ($T_S$) of the Dickson power converter, there is a 180-degree phase shift between the gate drive signal A of Q1, Q3 and Q5, and the gate drive signal B of Q2, Q4 and Q6. The gate drive signal $\overline{A}$ of Q8 and the gate drive signal A of Q1, Q3 and Q5 are two complementary signals. Likewise, the gate drive signal $\overline{B}$ of Q7 and the gate drive signal B of Q2, Q4 and Q6 are two complementary signals. The voltage on the node SWA is a plurality of first voltage pulses. The voltage on the node SWB is a plurality of second voltage pulses. In one switching cycle $T_S$, there is a 180-degree phase shift between a first voltage pulse and a second voltage pulse.

The gate drive signals F, G, $\overline{F}$ and $\overline{G}$ are configured to operate at a frequency equal to double the switching frequency of the Dickson power converter. As shown in FIG. 8, there is a phase shift between the gate drive signals F and G. The duty cycle of the second output cell 322 is D2 as shown in FIG. 8. The output voltage $V_{OUT2}$ is determined by the following equation:

$$V_{OUT2} = \frac{V_{OUT1}}{(1+D2)} \tag{1}$$

The output voltage $V_{OUT2}$ is 1.2 V when $V_{OUT1}$ is equal to 1.5 V and the duty cycle D2 is approximately equal to 0.25. The switching period is T2, which is one half of $T_S$.

As shown in FIG. 8, the upslope of the current flowing through L21 winding is in phase with the voltage on SWA. The upslope of the current flowing through L22 winding is in phase with the voltage on SWB. Due to the nature of coupled inductors, a secondary upslope can be observed on the current flowing through L21 winding, which is in phase with the voltage pulse on SWB. Similarly, a secondary upslope can be observed on the current flowing through L22 winding, which is in phase with the voltage pulse on SWA.

Similar to the case with the fourth output cell 324, the charging currents of the flying capacitors (C22 and C21) in the second output cell 322 also follow the currents flowing through winding L21 (I23) and winding L22 (I22), respectively. When the flying capacitors C22/C21 are discharged to the output, they also exhibit uneven current spikes due to the uneven charging current. However, with the help of the coupled inductors, the current ripple in the inductor link is reduced. In each switching cycle of the second output cell 322, a portion of the current ripple in the inductor link is fed into the second output cell to charge the flying capacitors. As a result of having the reduced current ripple, the amplitude variation in the flying capacitor's charging current is reduced. The reduced charging current helps to reduce the output current and voltage ripples of the second output cell 322.

Figure 9:
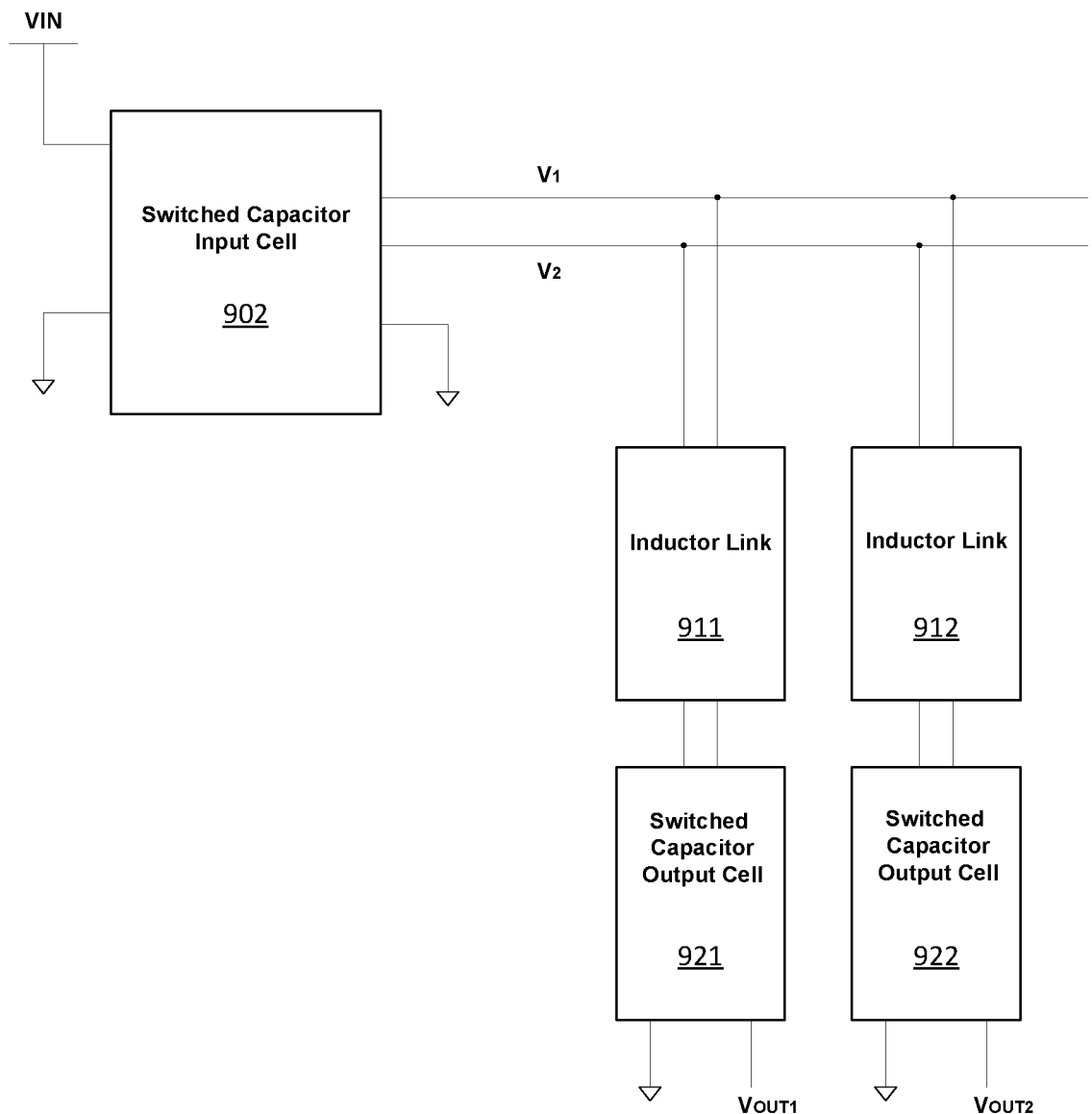
FIG. 9 illustrates a block diagram of a second implementation, a third implementation and a fourth implementation of the inductor-link power conversion system shown in FIG. 1 in accordance with various embodiments of the present disclosure.

FIG. 9 illustrates a block diagram of a second implementation, a third implementation and a fourth implementation of the inductor-link power conversion system shown in FIG. 1 in accordance with various embodiments of the present disclosure. The power conversion system shown in FIG. 9 comprises a switched capacitor input cell 902. The input of the switched capacitor input cell 902 is connected to the input voltage source VIN. The switched capacitor input cell 902 has two outputs. Each output is connected to a corresponding voltage rail of the two interleaved multilevel voltage rails $V_1$ and $V_2$.

The power conversion system shown in FIG. 9 further comprises two inductor links 911 and 912. As shown in FIG. 9, the two interleaved multilevel voltage rails $V_1$ and $V_2$ are coupled to the two inductor links. In particular, each one of the two inductor links is coupled to all of the two interleaved multilevel voltage rails.

As shown in FIG. 9, the power conversion system further comprises two switched capacitor output cells 921 and 922. Each switched capacitor output cell has inputs connected to outputs of a corresponding inductor link. The outputs of the two switched capacitor output cells form the dual outputs of the power conversion system.

In some embodiments, the inductor-link power conversion system shown in FIG. 9 is employed to convert power from a 48 V single input bus to the two low voltage outputs. The inductor-link power conversion system uses magnetic components (e.g., inductor links 911 and 912) as the intermediate link. The inductor-link power conversion system comprises a front-end switched capacitor stage to convert the voltage from 48 V to two interleaved multi-level voltage rails (e.g., interleaved multi-level voltage rails with a peak voltage in a range from 4 V to 8 V) for power distribution. In addition, the inductor-link power conversion system uses many low voltage switched capacitor converters (e.g., switched capacitor converters 921 and 922) for voltage regulation.

Figure 10:
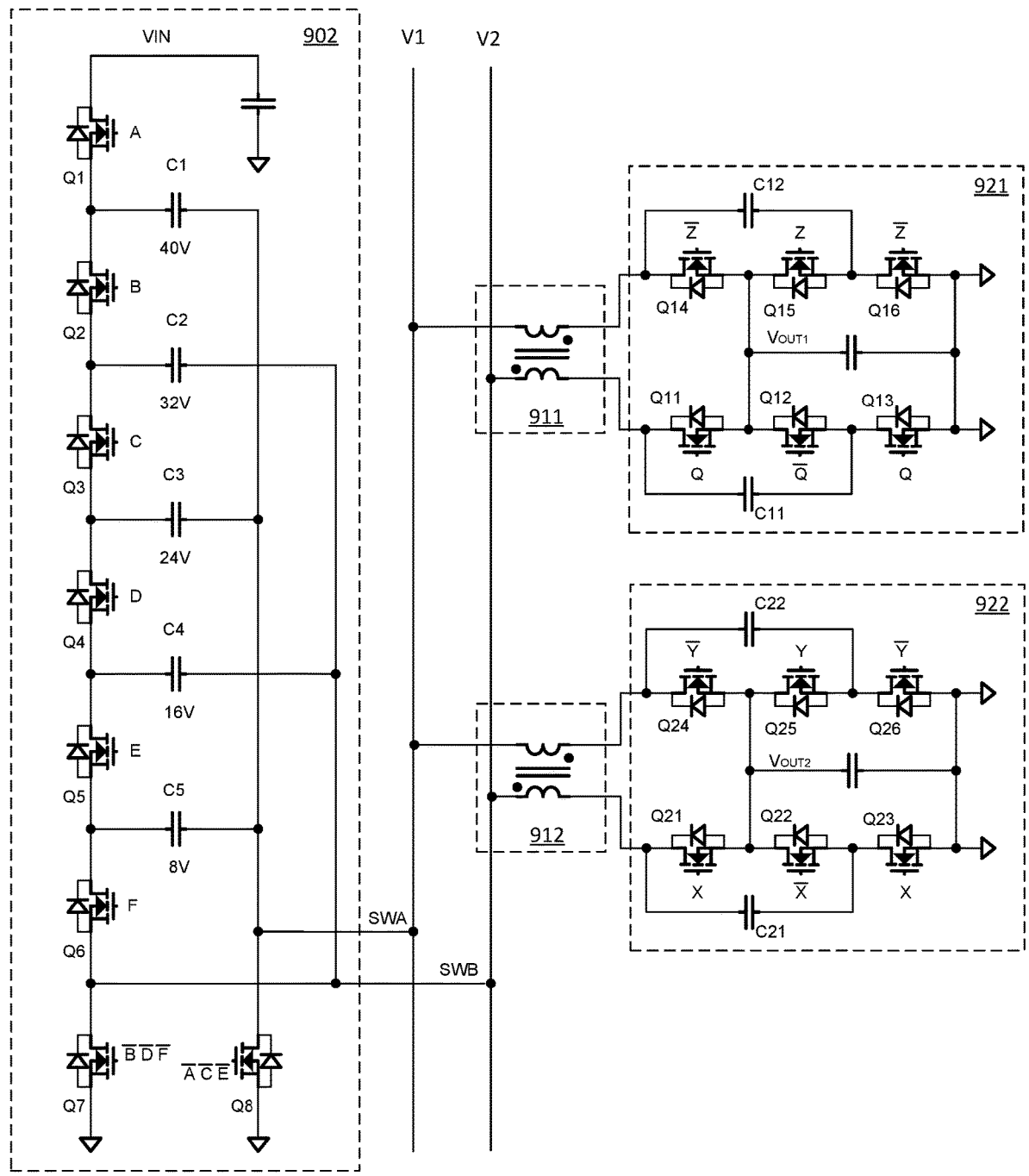
FIG. 10 illustrates a schematic diagram of the second implementation of the inductor-link power conversion system shown in FIG. 1 in accordance with various embodiments of the present disclosure.

FIG. 10 illustrates a schematic diagram of the second implementation of the inductor-link power conversion system shown in FIG. 1 in accordance with various embodiments of the present disclosure. The power conversion system shown in FIG. 10 comprises a switched capacitor input cell 902, a first inductor link 911, a second inductor link 912, a first output cell 921 and a second output cell 922.

As shown in FIG. 10, the input of the switched capacitor input cell 902 is connected to an input voltage bus (e.g., a 48 V voltage bus). A first output of the switched capacitor input cell 902 is connected to a first voltage rail $V_1$. A second output of the switched capacitor input cell 902 is connected to a second voltage rail $V_2$.

As shown in FIG. 10, the two inputs of the first inductor link 911 are connected to the two voltage rails $V_1$ and $V_2$, respectively. The two outputs of the first inductor link 911 are connected to the two inputs of the first output cell 921, respectively. The two inputs of the second inductor link 912 are connected to the two voltage rails $V_1$ and $V_2$, respectively. The two outputs of the second inductor link 912 are connected to the two inputs of the second output cell 922, respectively.

As shown in FIG. 10, similar to FIG. 4, the switched capacitor input cell 902 is also implemented as a Dickson power converter, but with a different control scheme, which will be described below with respect to FIG. 11. The voltages across the flying capacitors C1, C2, C3, C4 and C5 in the Dickson power converter are 40 V, 32 V, 24 V, 16 V and 8 V, respectively as shown in FIG. 10.

The first output cell 921 is implemented as a ladder switched capacitor converter. In operation, the first output cell 921 is configured to generate a regulated output voltage $V_{OUT1}$. The operation of the first output cell 921 will be described below with respect to FIG. 11.

The second output cell 922 is implemented as a switched capacitor converter. In operation, the second output cell 922 is configured to generate a regulated output voltage of $V_{OUT2}$. The operation of the second output cell 922 will be described below with respect to FIG. 11.

Figure 11:
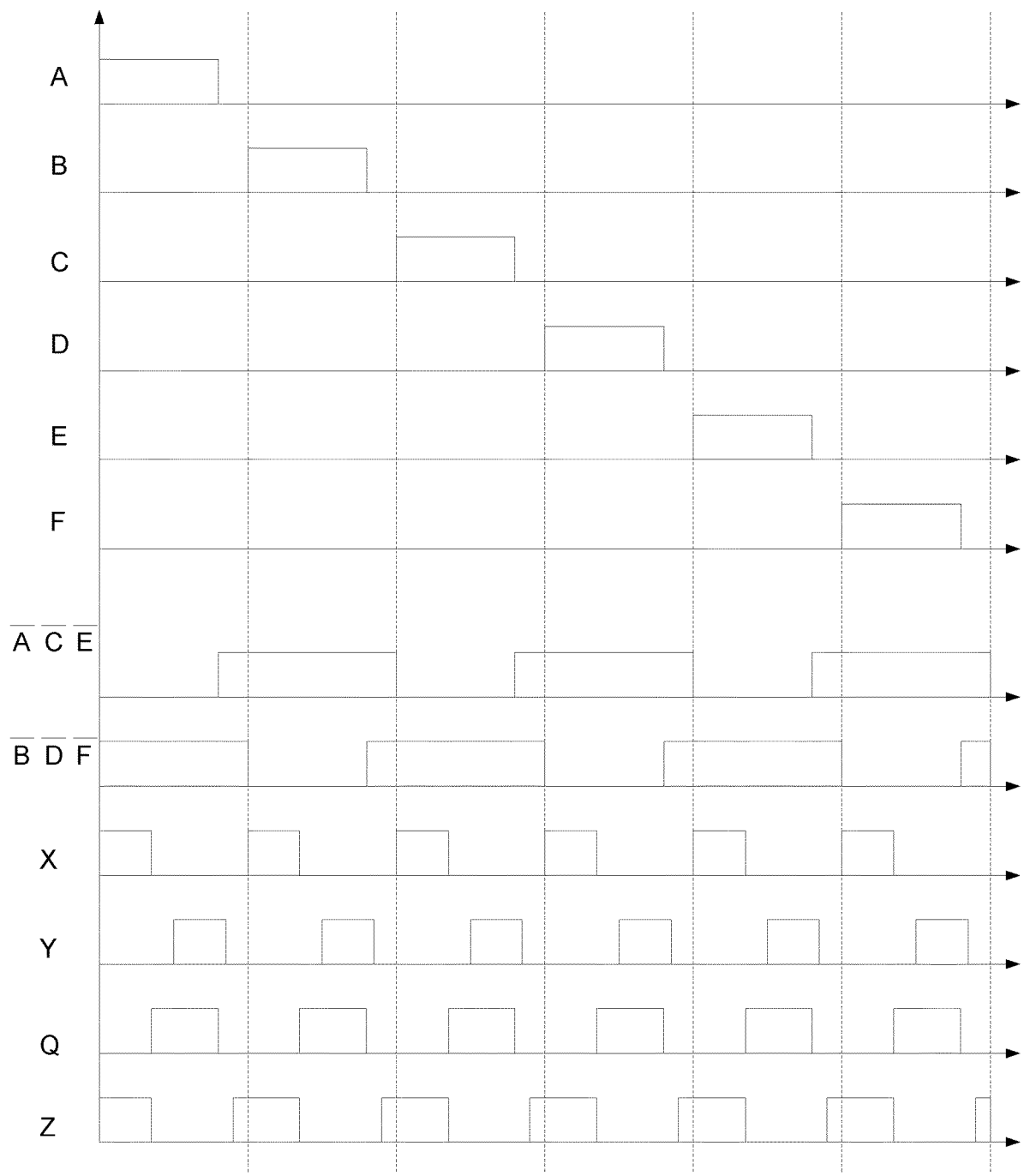
FIG. 11 illustrates various signals associated with the power conversion system shown in FIG. 10 in accordance with various embodiments of the present disclosure.

FIG. 11 illustrates various signals associated with the power conversion system shown in FIG. 10 in accordance with various embodiments of the present disclosure. The horizontal axis represents intervals of time. There are twelve rows. The first row represents the gate drive signal (A) of Q1. The second row represents the gate drive signal (B) of Q2. The third row represents the gate drive signal (C) of Q3. The fourth row represents the gate drive signal (D) of Q4. The fifth row represents the gate drive signal (E) of Q5. The sixth row represents the gate drive signal (F) of Q6. The seventh row represents the gate drive signal ($\overline{A}\cdot\overline{C}\cdot\overline{E}$) of Q8. A and $\overline{A}$ are two complementary signals. C and $\overline{C}$ are two complementary signals. E and $\overline{E}$ are two complementary signals. The eighth row represents the gate drive signal ($\overline{B}\cdot\overline{D}\cdot\overline{F}$) of Q7. B and $\overline{B}$ are two complementary signals. D and $\overline{D}$ are two complementary signals. F and $\overline{F}$ are two complementary signals. The ninth row represents the gate drive signals (X) of Q21 and Q23. The tenth row represents the gate drive signal (Y) of Q25. The eleventh row represents the gate drive signals (Q) of Q11 and Q13. The twelfth row represents the gate drive signal (Z) of Q15.

As shown in FIG. 11, gate drive signals A, B, C, D, E and F are of a same turn-on time and a same period T. Two adjacent gate drive signals of A, B, C, D, E and F are phase shifted by T/6 or 60 degrees. These gate drive signals are arranged in a sequential manner as shown in FIG. 11. The sequential nature of the turn on signals for the switches allows all flying capacitors of the Dickson power converter (input cell 902) to be charged in series with the inductor links 911 and 912 to achieve a soft charging feature. It also avoids putting capacitor paths in parallel so as to prevent unnecessary charge sharing losses from occurring. Both features, along with reduced switching losses offer efficiency improvement. This control scheme is ideal for cases where the current output of the Dickson power converter is relatively low or multiple Dickson converters are configured in parallel to supply current to the interleaved multilevel voltage rails.

As shown in FIG. 11, the gate drive signals X, Y, Q and Z indicate that the switching frequency of the output cells is higher than the switching frequency of the switched capacitor input cell (e.g., the switching frequency of the output cell is six times greater than that of the input cell as illustrated in FIG. 11). The higher switching frequency of the output cells helps to improve current sharing and voltage balancing of the two stages (i.e. output cells 921 and 922).

It should be noted that the gate drive signals X, Y, Q and Z are not required to be synchronized with the gate drive signals of the Dickson power converter. The gate drive signal pairs (X/Y and Q/Z) can have different duty ratios for voltage regulation.

Figure 12:
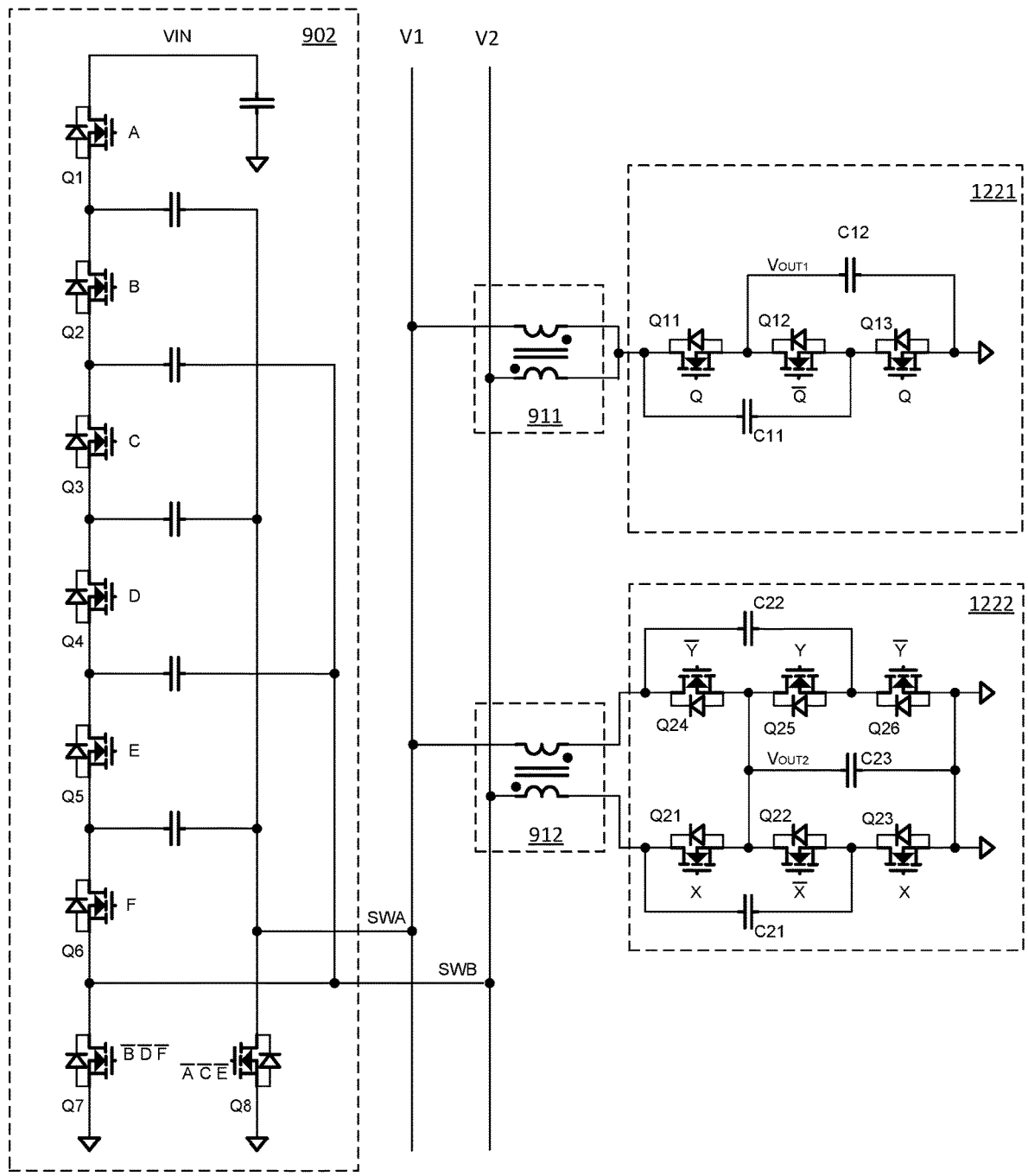
FIG. 12 illustrates a schematic diagram of the third implementation of the inductor-link power conversion system shown in FIG. 1 in accordance with various embodiments of the present disclosure.

FIG. 12 illustrates a schematic diagram of the third implementation of the inductor-link power conversion system shown in FIG. 1 in accordance with various embodiments of the present disclosure. The power conversion system shown in FIG. 12 comprises one switched capacitor input cell 902, two interleaved multilevel voltage rails $V_1$ and $V_2$, two inductor links 911 and 912, and two switched capacitor output cells 1221 and 1222.

The switched capacitor input cell 902 is implemented as a Dickson power converter with seven switches and five capacitors. The two outputs of the switched capacitor input cell are connected to the two interleaved multilevel voltage rails $V_1$ and $V_2$, respectively. Each inductor link comprises a coupled inductor having two inputs connected to the two interleaved multilevel voltage rails $V_1$ and $V_2$, respectively.

A first switched capacitor output cell 1221 is a single-phase converter comprising switches Q11, Q12 and Q13, and capacitors C11 and C12. The input of the first switched capacitor output cell 1221 is connected to both outputs of a first inductor link 911. In operation, the first switched capacitor output cell 1221 is configured to generate $V_{OUT1}$.

A second switched capacitor output cell 1222 is a dual-phase converter comprising switches Q21, Q22, Q23, Q24, Q25 and Q26, and capacitors C21, C22 and C23. The two phase leg inputs of the second switched capacitor output cell 1222 are connected to two outputs of a second inductor link 912, respectively. In operation, the second switched capacitor output cell 1222 is configured to generate $V_{OUT2}$.

It should be noted that depending on different design needs, the coupled inductor shown in FIG. 12 can be replaced by two separate inductors.

FIG. 13 illustrates a schematic diagram of the fourth implementation of the inductor-link power conversion system shown in FIG. 1 in accordance with various embodiments of the present disclosure. The power conversion system shown in FIG. 13 is similar to that shown in FIG. 12 except that the switched capacitor input cell 902 is implemented as two half-bridge converters connected between VIN and ground. The two outputs of the two half-bridge converters are connected to the two interleaved multilevel voltage rails $V_1$ and $V_2$, respectively. A first half-bridge converter comprises switches Q1 and Q2 connected in series between VIN and ground. A second half-bridge converter comprises switches Q3 and Q4 connected in series between VIN and ground. In operation, the two half-bridge converters are configured to operate out of phase to generate the interleaved multilevel voltage signals for $V_1$ and $V_2$, respectively.

Each inductor link comprises a coupled inductor having two inputs connected to the two interleaved multilevel voltage rails $V_1$ and $V_2$, respectively. A first output cell 1321 is a boost converter comprising switches Q11 and Q12, and capacitor C11. The input of the first output cell 1321 is connected to both outputs of a first inductor link 911. In operation, the first output cell 1321 is configured to generate $V_{OUT1}$.

A second output cell 1322 is a dual-phase boost converter comprising switches Q21, Q22, Q23 and Q24, and capacitor C21. The two inputs of the two phase legs of the second output cell 1322 are connected to outputs of a second inductor link 912, respectively. In operation, the second output cell 1322 is configured to generate $V_{OUT2}$.

It should be noted that depending on different design needs, the coupled inductor shown in FIG. 13 can be replaced by two separate inductors.

Figure 14:
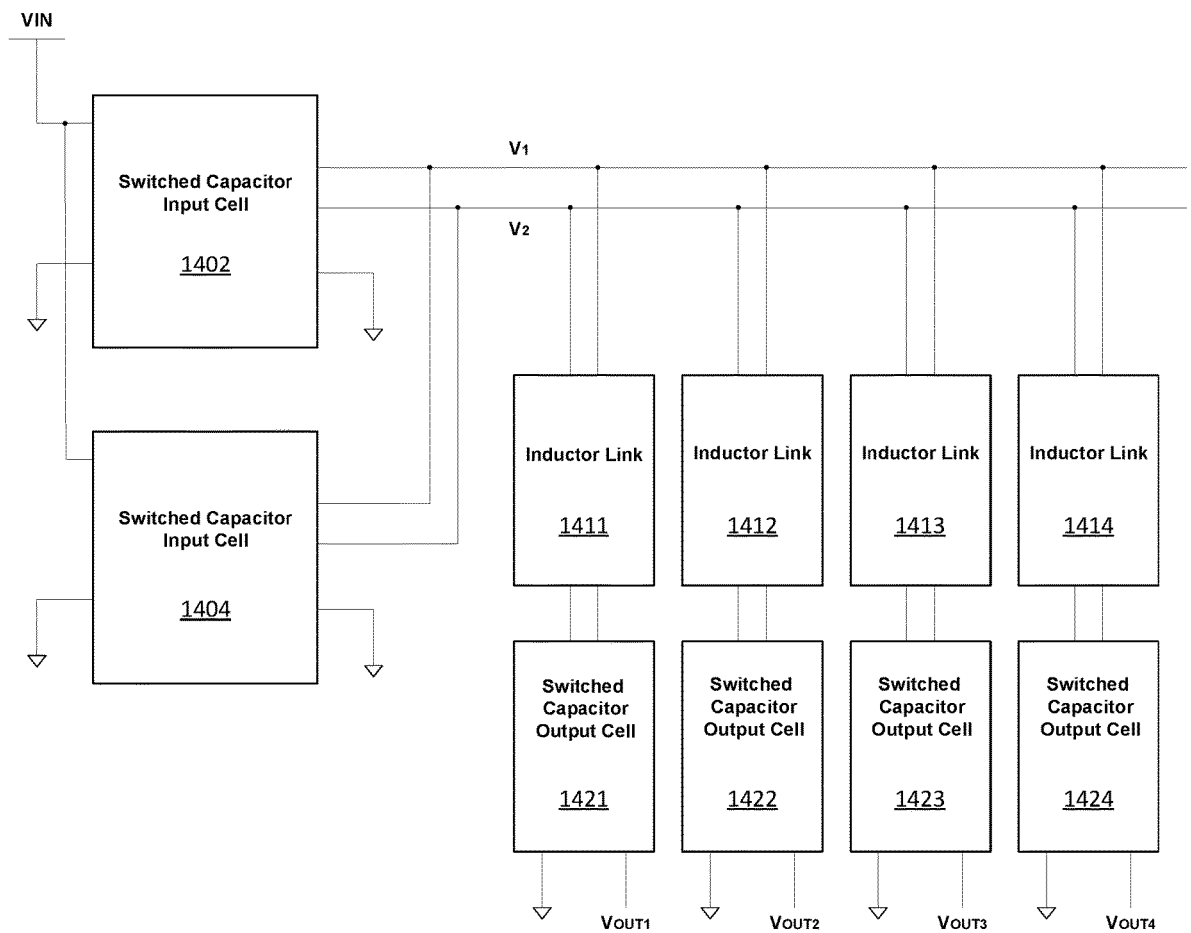
FIG. 14 illustrates a block diagram of a fifth implementation of the inductor-link power conversion system shown in FIG. 1 in accordance with various embodiments of the present disclosure.

FIG. 14 illustrates a block diagram of a fifth implementation of the inductor-link power conversion system shown in FIG. 1 in accordance with various embodiments of the present disclosure. The power conversion system shown in FIG. 14 comprises two switched capacitor input cells 1402 and 1404. The inputs of the two switched capacitor input cells 1402 and 1404 are connected to an input voltage source VIN. Each switched capacitor input cell has two outputs. Each output is connected to a corresponding voltage rail of two interleaved multilevel voltage rails $V_1$ and $V_2$.

The power conversion system shown in FIG. 14 further comprises four inductor links 1411, 1412, 1413 and 1414. As shown in FIG. 14, the two interleaved multilevel voltage rails $V_1$ and $V_2$ are coupled to the four inductor links. Each of the four inductor links is coupled to all of the plurality of interleaved multilevel voltage rails $V_1$ and $V_2$.

As shown in FIG. 14, the power conversion system further comprises four switched capacitor output cells 1421, 1422, 1423 and 1424. Each switched capacitor output cell has inputs connected to outputs of a corresponding inductor link. The outputs of the four switched capacitor output cells 1421, 1422, 1423 and 1424 form the multiple outputs of the power conversion system.

In some embodiments, the inductor-link power conversion system shown in FIG. 14 is employed to convert power from a 12 V single input bus to the multiple low voltage outputs. The inductor-link power conversion system uses magnetic components (e.g., inductor links 1411, 1412, 1413 and 1414) as the intermediate link. The inductor-link power conversion system comprises a front-end switched capacitor stage to convert the voltage from 12 V to multiple interleaved multi-level voltage rails (e.g., interleaved multi-level voltage rails with a peak voltage in a range from 4 V to 6 V) for power distribution. In addition, the inductor-link power conversion system uses many low voltage switched capacitor converters (e.g., switched capacitor output cells 1421, 1422, 1423 and 1424) for voltage regulation.

The system configuration shown in FIG. 14 is merely an example, which should not unduly limit the scope of the claims. One of ordinary skill in the art would recognize many variations, alternatives, and modifications. For example, the number of the switched capacitor input cells and/or the number of switched capacitor output cells may vary depending on different design needs.

Figure 15:
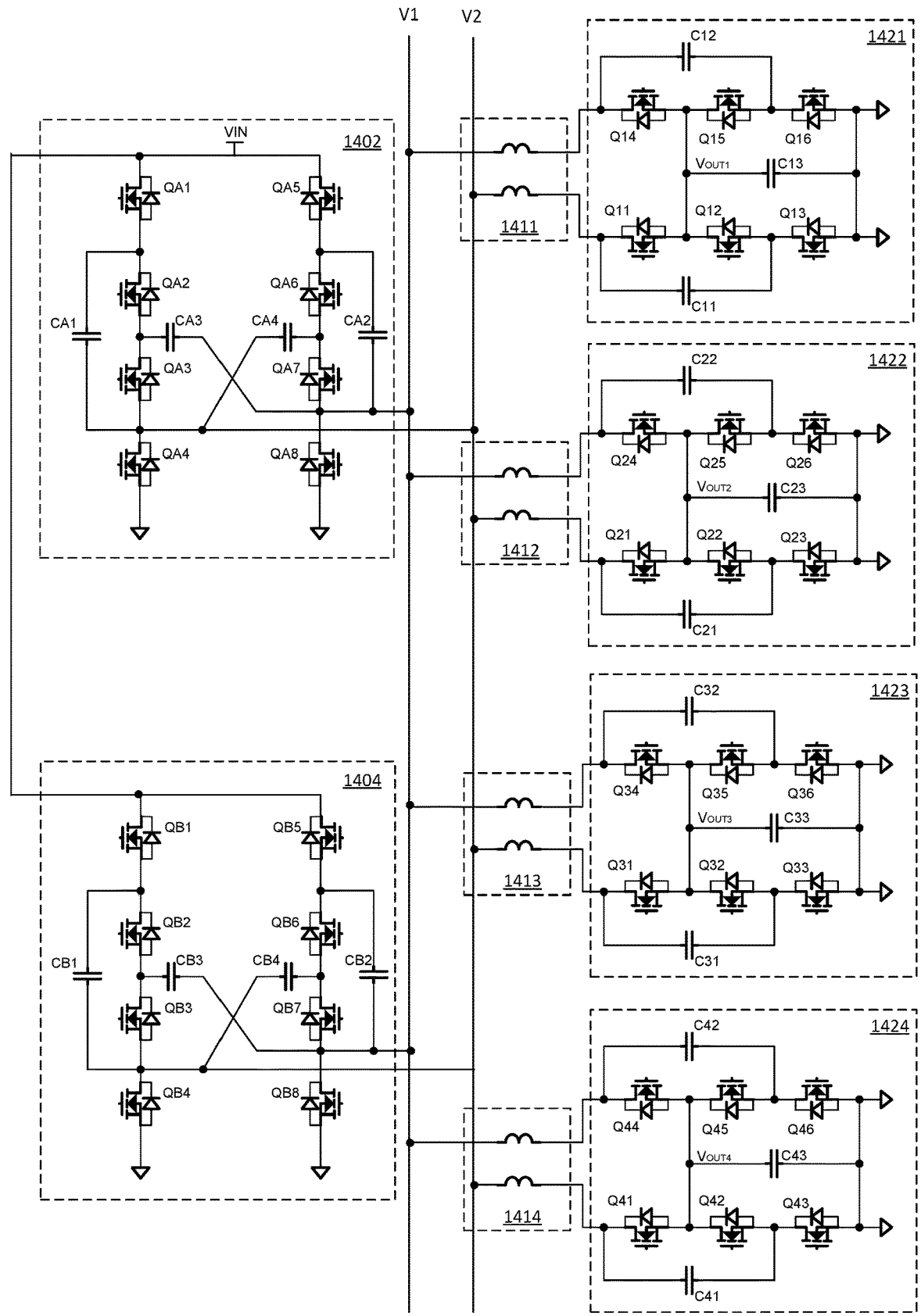
FIG. 15 illustrates a schematic diagram of the fifth implementation of the inductor-link power conversion system shown in FIG. 1 in accordance with various embodiments of the present disclosure.

FIG. 15 illustrates a schematic diagram of the fifth implementation of the inductor-link power conversion system shown in FIG. 1 in accordance with various embodiments of the present disclosure. The power conversion system shown in FIG. 15 comprises two switched capacitor input cells 1402 and 1404, two interleaved multilevel voltage rails $V_1$ and $V_2$, four inductor links 1411, 1412, 1413 and 1414 and four switched capacitor output cells 1421, 1422, 1423 and 1424.

As shown in FIG. 15, a first switched capacitor input cell 1402 comprises switches QA1, QA2, QA3, QA4, QA5, QA6, QA7 and QA8, and capacitors CA1, CA2, CA3 and CA4. As shown in FIG. 15, capacitors CA3 and CA4 are cross-coupled between the two phase legs of the first switched capacitor input cell 1402.

A second switched capacitor input cell 1404 comprises switches QB1, QB2, QB3, QB4, QB5, QB6, QB7 and QB8, and capacitors CB1, CB2, CB3 and CB4. As shown in FIG. 15, capacitors CB3 and CB4 are cross-coupled between the two phase legs of the second switched capacitor input cell 1404.

In some embodiments, the two switched capacitor input cells 1402 and 1404 are configured as dual-phase cross-coupled 3:1 Dickson converters to drive the two interleaved multilevel voltage rails $V_1$ and $V_2$ with voltage pulses having an amplitude equal to VIN/3.

As shown in FIG. 15, a first switched capacitor output cell 1421 comprises switches Q11, Q12, Q13, Q14, Q15 and Q16, and capacitors C11, C12 and C13. A second switched capacitor output cell 1422 comprises switches Q21, Q22, Q23, Q24, Q25 and Q26, and capacitors C21, C22 and C23. A third switched capacitor output cell 1423 comprises switches Q31, Q32, Q33, Q34, Q35 and Q36, and capacitors C31, C32 and C33. A fourth switched capacitor output cell 1424 comprises switches Q41, Q42, Q43, Q44, Q45 and Q46, and capacitors C41, C42 and C43.

The four switched capacitor output cells 1421, 1422, 1423 and 1424 are implemented as two-phase interleaved current source switched capacitor current multipliers. Each output cell is connected to both interleaved multilevel voltage rails $V_1$ and $V_2$ through two discrete parallel inductors. Each switched-capacitor output cell is configured to generate one output voltage. In some embodiments, to ensure current sharing, all input cells should interface with all interleaved multilevel voltage rails, and all output cells should interface with all interleaved multilevel voltage rails. In some embodiments, all output cells can be configured to generate the same output voltage and provide power to a common load through a single output point. Furthermore, the multitude of the output cells could be configured to operate in an interleaved fashion to reduce the overall output voltage ripple.

Figure 16:
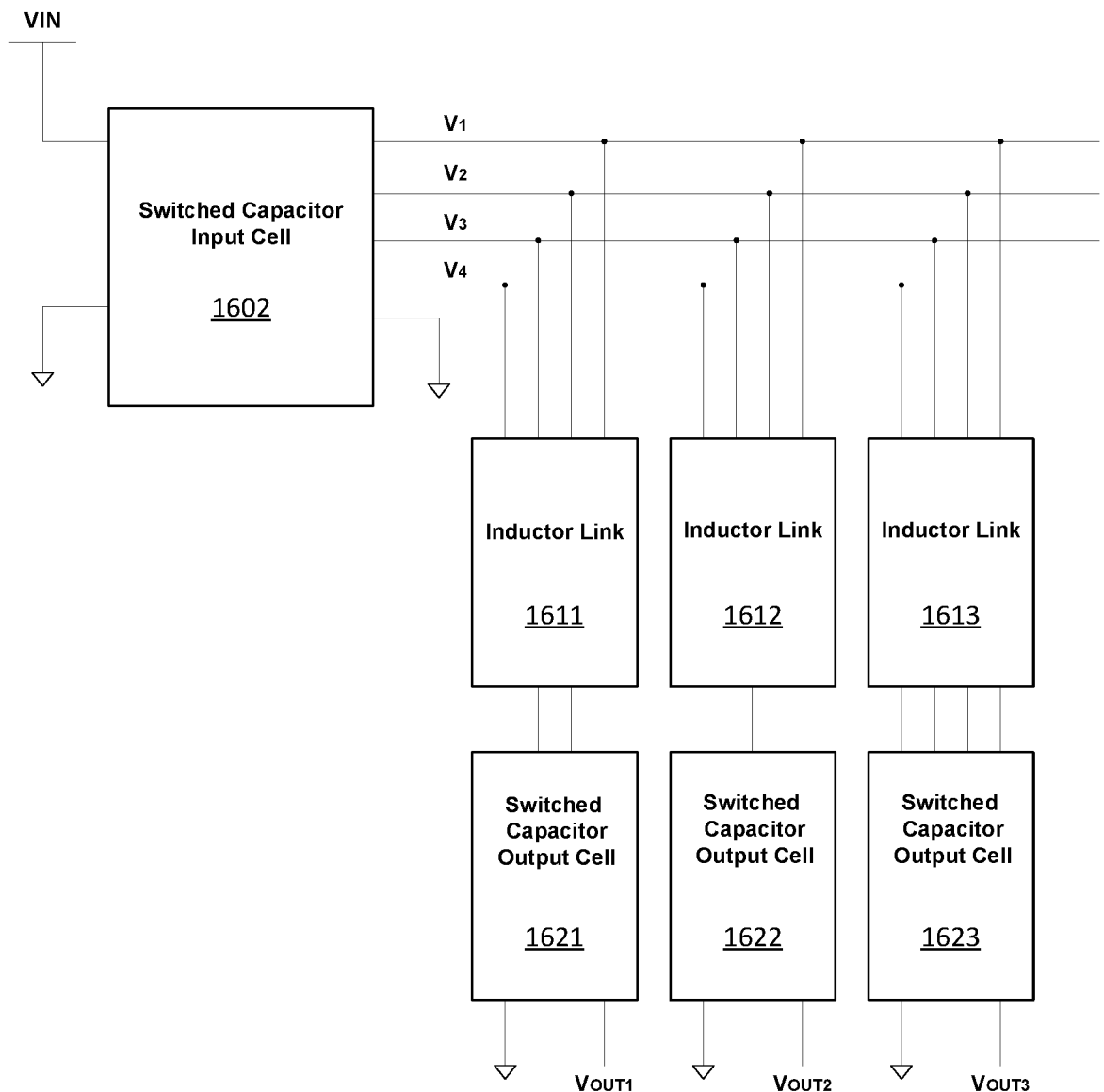
FIG. 16 illustrates a block diagram of a sixth implementation of the inductor-link power conversion system shown in FIG. 1 in accordance with various embodiments of the present disclosure.

FIG. 16 illustrates a block diagram of a sixth implementation of the inductor-link power conversion system shown in FIG. 1 in accordance with various embodiments of the present disclosure. The power conversion system shown in FIG. 16 comprises one switched capacitor input cell 1602. The inputs of the switched capacitor input cell 1602 are connected to an input voltage source VIN. The switched capacitor input cell 1602 has four outputs. Each output is connected to a corresponding voltage rail of four interleaved multilevel voltage rails $V_1$, $V_2$, $V_3$ and $V_4$.

The power conversion system shown in FIG. 16 further comprises three inductor links 1611, 1612 and 1613. As shown in FIG. 16, the four interleaved multilevel voltage rails $V_1$, $V_2$, $V_3$ and $V_4$ are coupled to the three inductor links 1611, 1612 and 1613. Each one of the three inductor links is coupled to all of the four interleaved multilevel voltage rails $V_1$, $V_2$, $V_3$ and $V_4$.

As shown in FIG. 16, the power conversion system further comprises three switched capacitor output cells 1621, 1622 and 1623. Each switched capacitor output cell has inputs connected to outputs of a corresponding inductor link. The outputs of the three switched capacitor output cells 1621, 1622 and 1623 form the multiple outputs of the power conversion system.

In some embodiments, the inductor-link power conversion system shown in FIG. 16 is employed to convert power from a 48 V single input bus to multiple low voltage outputs. The inductor-link power conversion system uses magnetic components (e.g., inductor links 1611, 1612 and 1613) as the intermediate link. The inductor-link power conversion system comprises a front-end switched capacitor stage to convert the voltage from 48 V to multiple interleaved multilevel voltage rails (e.g., interleaved multi-level voltage rails with a peak voltage in a range from 4 V to 8 V) for power distribution. In addition, the inductor-link power conversion system uses many low voltage switched capacitor converters (e.g., switched capacitor output cells 1621, 1622 and 1623) for voltage regulation.

Figure 17:
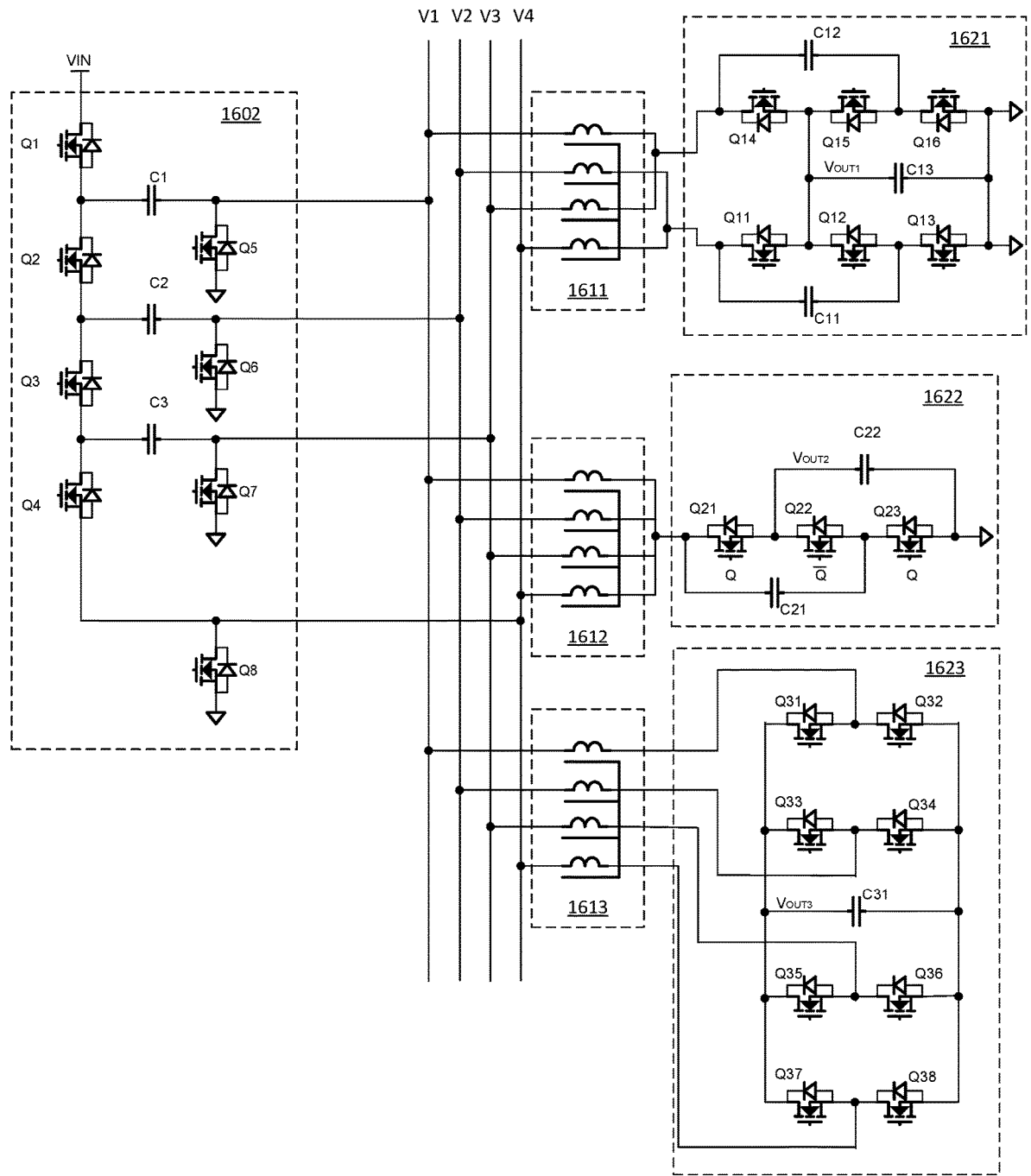
FIG. 17 illustrates a schematic diagram of the sixth implementation of the inductor-link power conversion system shown in FIG. 1 in accordance with various embodiments of the present disclosure.

FIG. 17 illustrates a schematic diagram of the sixth implementation of the inductor-link power conversion system shown in FIG. 1 in accordance with various embodiments of the present disclosure. The power conversion system comprises one switched capacitor input cell 1602, four interleaved multilevel voltage rails $V_1$-$V_4$, three inductor links 1611, 1612 and 1613, and three switched capacitor output cells 1621, 1622 and 1623.

As shown in FIG. 17, the switched capacitor input cell 1602 is a series-capacitor converter. The switched capacitor input cell 1602 comprises switches Q1, Q2, Q3, Q4, Q5, Q6, Q7 and Q8, and capacitors C1, C2 and C3.

In operation, the switched capacitor input cell 1602 is configured to drive the four interleaved multilevel voltage rails $V_1$-$V_4$. In particular, the switched capacitor input cell 1602 is configured to "chop" the input voltage VIN into four slices equal in duration and equal in voltage. These four equal duration slices are employed to drive the four voltage rails $V_1$-$V_4$ with interleaved voltage pulses having a peak amplitude of VIN/4, respectively.

Each switched capacitor output cell is connected to all four interleaved multilevel voltage rails through coupled or discrete inductors. Each switched capacitor output cell is configured to generate one output voltage. As shown in FIG. 17, the first switched capacitor output cell 1621 is implemented as a dual-phase switched capacitor converter comprising switches Q11, Q12, Q13, Q14, Q15 and Q16, and capacitors C11, C12 and C13. Each phase leg of the dual-phase switched capacitor converter is connected to a sub-set of output terminals of the first inductor link 1621 as shown in FIG. 17. In operation, the first switched capacitor output cell 1621 is configured to generate $V_{OUT1}$.

The second switched capacitor output cell 1622 is implemented as a single-phase switched capacitor converter comprising switches Q21, Q22 and Q23, and capacitors C21 and C22. The single-phase switched capacitor converter is connected to the second inductor link 1612 at a single node as shown in FIG. 17. In operation, the second switched capacitor output cell 1622 is configured to generate $V_{OUT2}$.

The third switched capacitor output cell 1623 is implemented as a quad-phase switched capacitor converter comprising switches Q31, Q32, Q33, Q34, Q35, Q36, Q37 and Q38, and capacitor C31. Each phase leg of the quad-phase switched capacitor converter is connected to a corresponding output terminal of the third inductor link 1613 as shown in FIG. 17. In operation, the third switched capacitor output cell 1623 is configured to generate $V_{OUT3}$.

Figure 18:
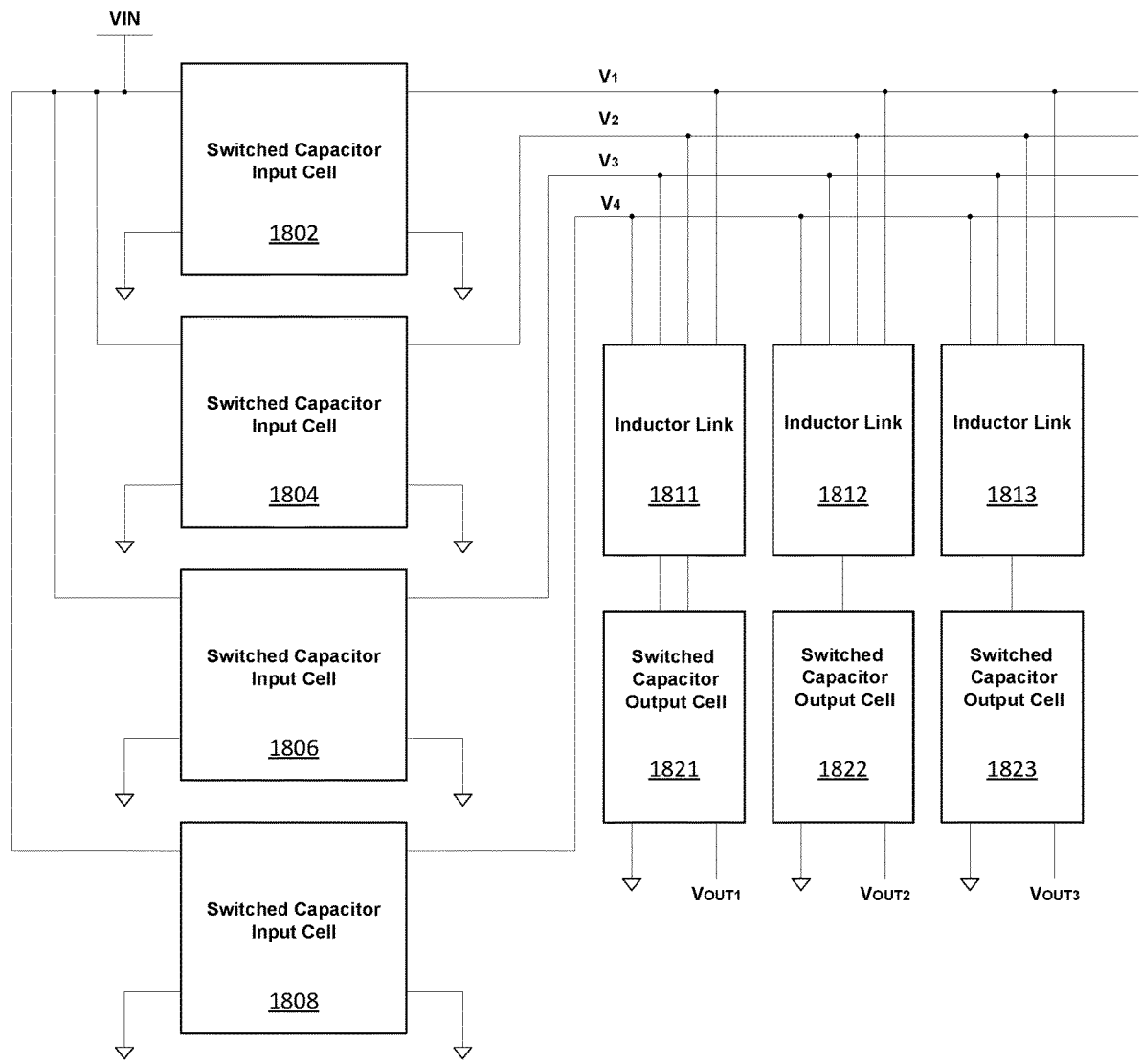
FIG. 18 illustrates a block diagram of another inductor-link power conversion system in accordance with various embodiments of the present disclosure.

FIG. 18 illustrates a block diagram of another inductor-link power conversion system in accordance with various embodiments of the present disclosure. The power conversion system shown in FIG. 18 comprises four switched capacitor input cells 1802, 1804, 1806 and 1808. The inputs of each switched capacitor input cell are connected to an input voltage source VIN. Each switched capacitor input cell has one output. Four outputs of the four switched capacitor input cells 1802, 1804, 1806 and 1808 are connected to four interleaved multilevel voltage rails $V_1$, $V_2$, $V_3$ and $V_4$, respectively as shown in FIG. 18.

The power conversion system shown in FIG. 18 further comprises three inductor links 1811, 1812 and 1813. As shown in FIG. 18, the four interleaved multilevel voltage rails $V_1$, $V_2$, $V_3$ and $V_4$ are coupled to the three inductor links 1811, 1812 and 1813. In particular, each of the three inductor links is coupled to all of the four interleaved multilevel voltage rails $V_1$, $V_2$, $V_3$ and $V_4$.

As shown in FIG. 18, the power conversion system further comprises three switched capacitor output cells 1821, 1822 and 1823. Each switched capacitor output cell has inputs connected to outputs of a corresponding inductor link. The outputs of the three switched capacitor output cells 1821, 1822 and 1823 form the multiple outputs of the power conversion system.

In some embodiments, the inductor-link power conversion system shown in FIG. 18 is employed to convert power from a 48 V single input bus to multiple low voltage outputs. The inductor-link power conversion system uses magnetic components (e.g., inductor links 1811, 1812 and 1813) as the intermediate link. The inductor-link power conversion system comprises a front-end switched capacitor stage to convert the voltage from 48 V to multiple interleaved multi-level voltage rails (e.g., interleaved multi-level voltage rails with a peak voltage in a range from 4 V to 8 V) for power distribution. In addition, the inductor-link power conversion system uses many low voltage switched capacitor converters e.g., switched capacitor output cells 1821, 1822 and 1823) for voltage regulation.

Figure 19:
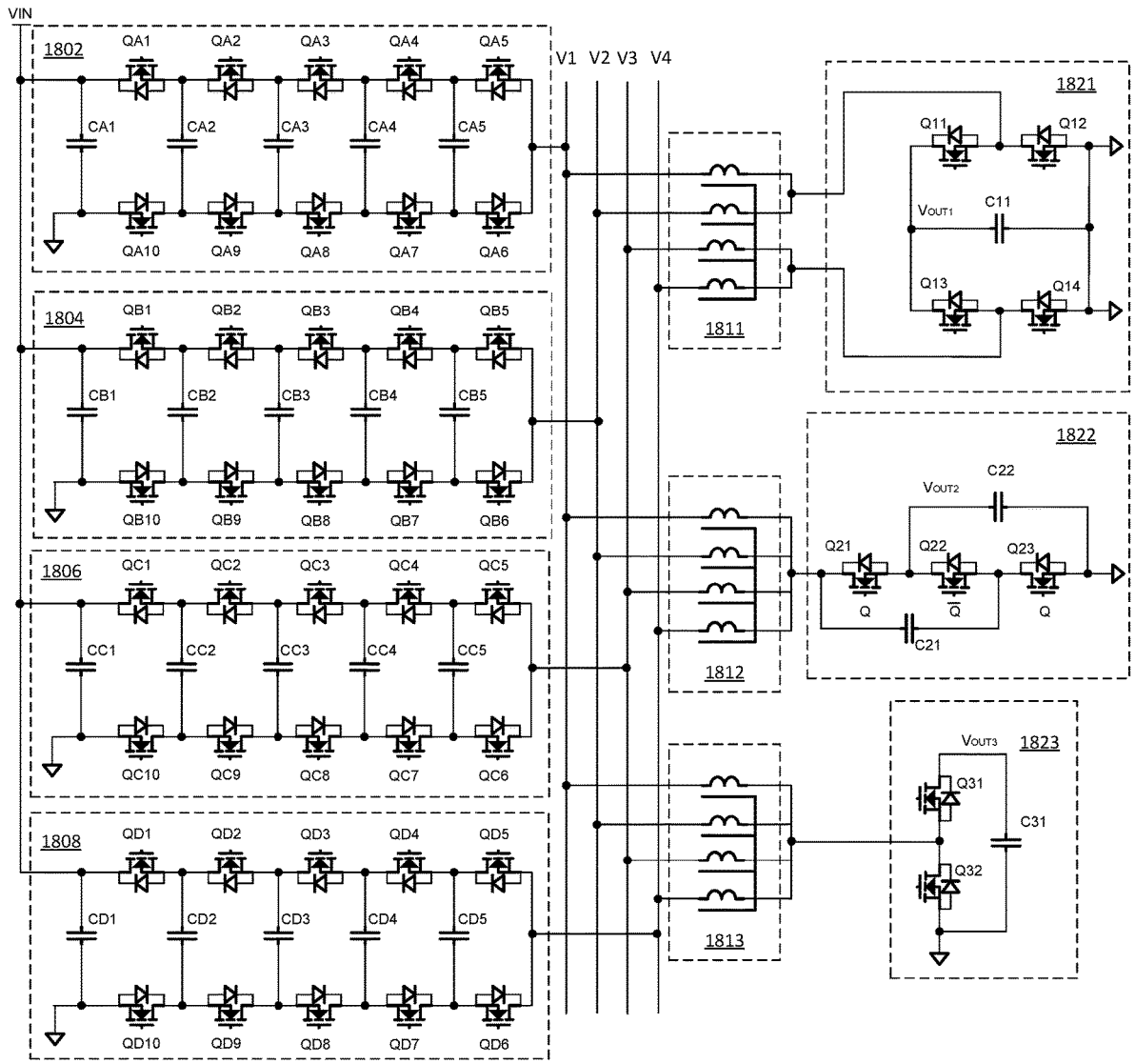
FIG. 19 illustrates a schematic view of the inductor-link power conversion system shown in FIG. 18 in accordance with various embodiments of the present disclosure.

FIG. 19 illustrates a schematic view of the inductor-link power conversion system shown in FIG. 18 in accordance with various embodiments of the present disclosure. The power conversion system shown in FIG. 19 comprises four switched capacitor input cells 1802, 1804, 1806 and 1808, four interleaved multilevel voltage rails $V_1$-$V_4$, three inductor links 1811, 1812 and 1813 and three output cells 1821, 1822 and 1823.

A first switched capacitor input cell 1802 comprises switches QA1, QA2, QA3, QA4, QA5, QA6, QA7, QA8, QA9 and QA10, and capacitors CA1, CA2, CA3, CA4 and CA5. The output of the first switched capacitor input cell 1802 is connected to the interleaved multilevel voltage rails $V_1$ as shown in FIG. 19.

A second switched capacitor input cell 1804 comprises switches QB1, QB2, QB3, QB4, QB5, QB6, QB7, QB8, QB9 and QB10, and capacitors CB1, CB2, CB3, CB4 and CB5. The output of the second switched capacitor input cell 1804 is connected to the interleaved multilevel voltage rails $V_2$ as shown in FIG. 19.

A third switched capacitor input cell 1806 comprises switches QC1, QC2, QC3, QC4, QC5, QC6, QC7, QC8, QC9 and QC10, and capacitors CC1, CC2, CC3, CC4 and CC5. The output of the third switched capacitor input cell 1806 is connected to the interleaved multilevel voltage rails $V_3$ as shown in FIG. 19.

A fourth switched capacitor input cell 1808 comprises switches QD1, QD2, QD3, QD4, QD5, QD6, QD7, QD8, QD9 and QD10, and capacitors CD1, CD2, CD3, CD4 and CD5. The output of the fourth switched capacitor input cell 1808 is connected to the interleaved multilevel voltage rails $V_4$ as shown in FIG. 19.

In operation, each switched capacitor input cell is configured to operate with a 90-degree phase shift to drive a corresponding interleaved multilevel voltage rail with voltage pulses having a fraction of the input voltage VIN as their amplitudes.

A first inductor link 1811 comprises four windings magnetically coupled to each other as shown in FIG. 19. The inputs of the four windings are connected to the four interleaved multilevel voltage rails $V_1$-$V_4$, respectively. The outputs of the first winding and the second winding are connected together and further connected to a first input of a first output cell 1821. The outputs of the third winding and the fourth winding are connected together and further connected to a second input of the first output cell 1821.

A second inductor link 1812 comprises four windings magnetically coupled to each other as shown in FIG. 19. The inputs of the four windings are connected to the four interleaved multilevel voltage rails $V_1$-$V_4$, respectively. The outputs of the four windings are connected together and further connected to an input of a second output cell 1822.

A third inductor link 1813 comprises four windings magnetically coupled to each other as shown in FIG. 19. The inputs of the four windings are connected to the four interleaved multilevel voltage rails $V_1$-$V_4$, respectively. The outputs of the four windings are connected together and further connected to an input of a third output cell 1823.

The first output cell 1821 is a dual-phase boost converter comprising switches Q11, Q12, Q13 and Q14, and capacitor C11. In operation, the first output cell 1821 is configured to generate $V_{OUT1}$.

The second output cell 1822 is implemented as a single-phase switched capacitor converter comprising switches Q21, Q22 and Q23, and capacitors C21 and C22. The single-phase switched capacitor converter is connected to the second inductor link 1812 at a single node as shown in FIG. 19. In operation, the second output cell 1822 is configured to generate $V_{OUT2}$.

The third output cell 1823 is a boost converter comprising switches Q31 and Q32, and capacitor C31. In operation, the third output cell 1823 is configured to generate $V_{OUT3}$.

As shown in FIG. 19, each switched capacitor output cell is connected to all interleaved multilevel voltage rails through coupled or discrete inductors. Each switched capacitor output cell is configured to generate one output voltage.

It should be noted that for all inductor-link switched capacitor power conversion systems discussed above, the switching frequency of the output switched capacitor cell is not lower than the switching frequency of the switched capacitor input cell. In some embodiments, it is desirable to configure the switching frequency of the output switched capacitor cell to be N times the switching frequency of the switched capacitor input cell. N is a predetermined integer.

Figure 20:
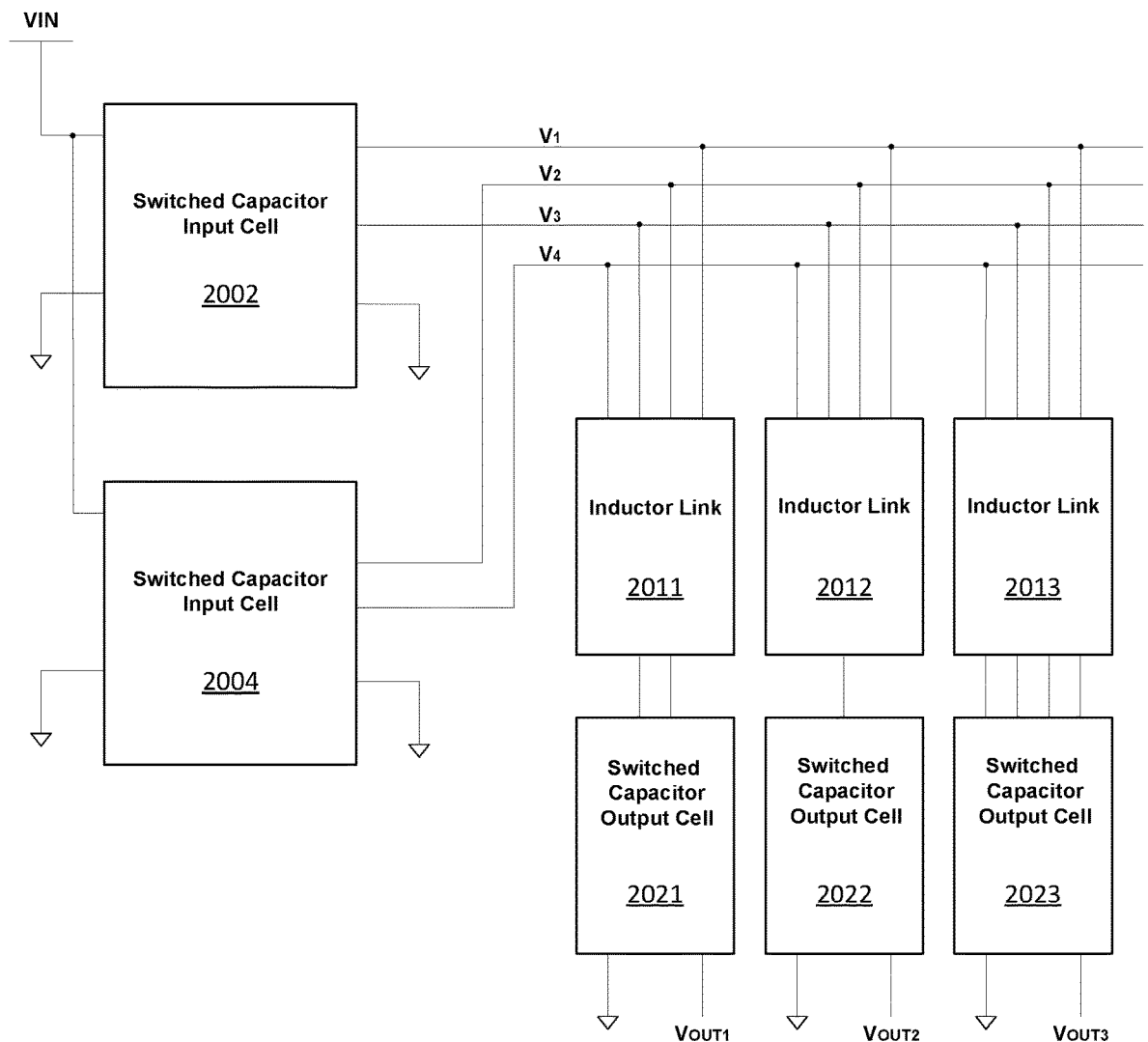
FIG. 20 illustrates a block diagram of another inductor-link power conversion system in accordance with various embodiments of the present disclosure.

FIG. 20 illustrates a block diagram of another inductor-link power conversion system in accordance with various embodiments of the present disclosure. The power conversion system shown in FIG. 20 comprises two switched capacitor input cells 2002 and 2004 and four interleaved multilevel voltage rails $V_1$, $V_2$, $V_3$ and $V_4$. The inputs of the two switched capacitor input cells 2002 and 2004 are connected to an input voltage source VIN. Each switched capacitor input cell has two outputs. The outputs of the switched capacitor input cell 2002 are connected to interleaved multilevel voltage rails $V_1$ and $V_3$, respectively as shown in FIG. 20. In other words, the outputs of the switched capacitor input cell 2002 are connected to a first subset ($V_1$ and $V_3$) of the plurality of interleaved multilevel voltage rails. Likewise, the outputs of the switched capacitor input cell 2004 are connected to interleaved multilevel voltage rails $V_2$ and $V_4$, respectively as shown in FIG. 20. In other words, the outputs of the switched capacitor input cell 2004 are connected to a second subset ($V_2$ and $V_4$) of the plurality of interleaved multilevel voltage rails.

The power conversion system shown in FIG. 20 further comprises three inductor links 2011, 2012 and 2013. As shown in FIG. 20, the four interleaved multilevel voltage rails $V_1$, $V_2$, $V_3$ and $V_4$ are coupled to the three inductor links. Each one of the three inductor links is coupled to all of the plurality of interleaved multilevel voltage rails $V_1$, $V_2$, $V_3$ and $V_4$.

As shown in FIG. 20, the power conversion system further comprises three switched capacitor output cells 2021, 2022 and 2023. Each switched capacitor output cell has inputs connected to outputs of a corresponding inductor link. The outputs of the three switched capacitor output cells 2021, 2022 and 2023 form the multiple outputs of the power conversion system.

Figure 21:
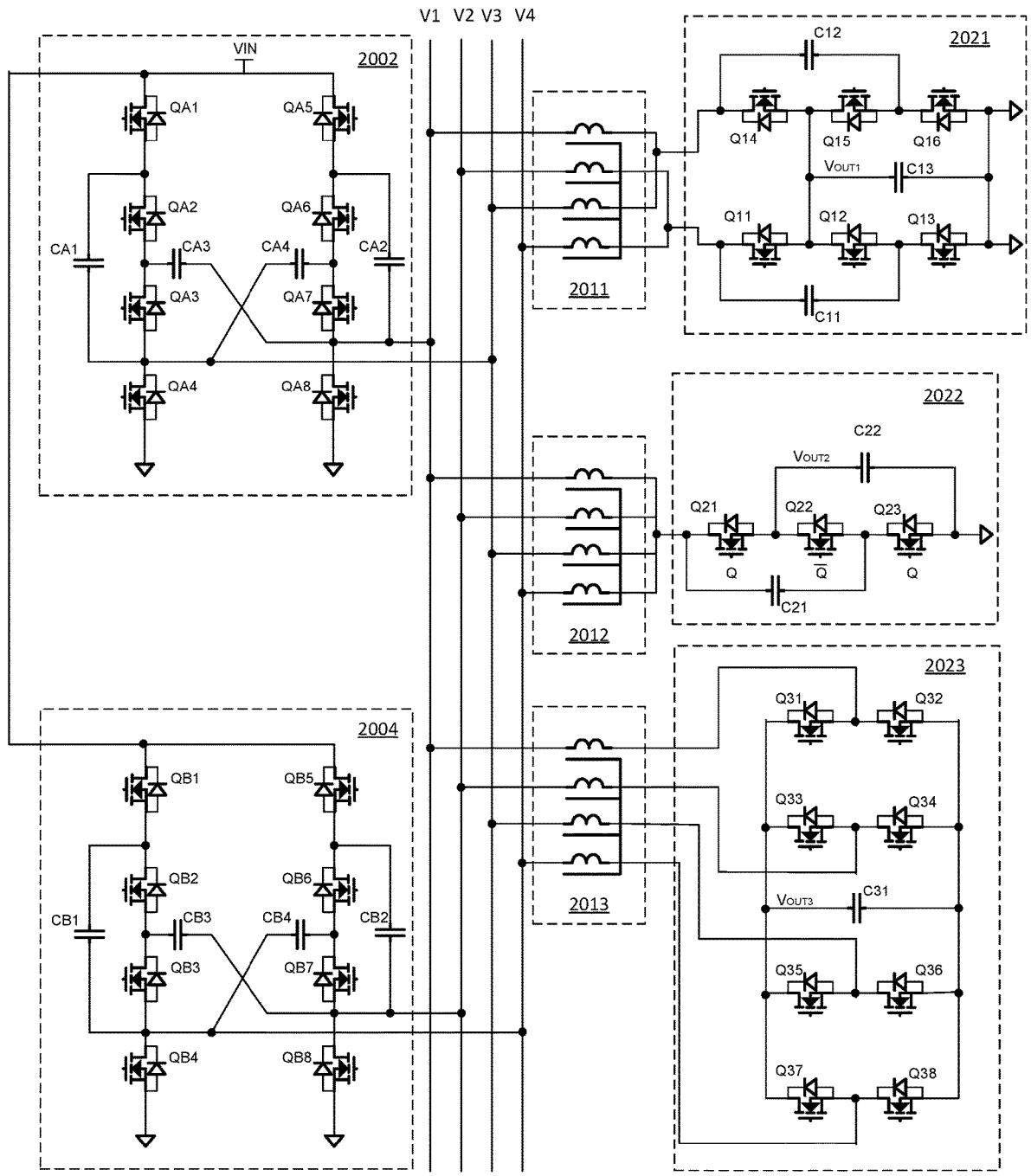
FIG. 21 illustrates a schematic view of the inductor-link power conversion system shown in FIG. 20 in accordance with various embodiments of the present disclosure.

FIG. 21 illustrates a schematic view of the inductor-link power conversion system shown in FIG. 20 in accordance with various embodiments of the present disclosure. The power conversion system shown in FIG. 21 comprises two switched capacitor input cells 2002 and 2004, four interleaved multilevel voltage rails $V_1$-$V_4$, three inductor links 2011, 2012 and 2013, and three switched capacitor output cells 2021, 2022 and 2023.

As shown in FIG. 21, a first switched capacitor input cell 2002 comprises switches QA1, QA2, QA3, QA4, QA5, QA6, QA7 and QA8, and capacitors CA1, CA2, CA3 and CA4. As shown in FIG. 21, capacitors CA3 and CA4 are cross-coupled between the two phase legs of the first switched capacitor input cell 2002.

A second switched capacitor input cell 2004 comprises switches QB1, QB2, QB3, QB4, QB5, QB6, QB7 and QB8, and capacitors CB1, CB2, CB3 and CB4. As shown in FIG.

21, capacitors CB3 and CB4 are cross-coupled between the two phase legs of the second switched capacitor input cell 2004.

In some embodiments, the two switched capacitor input cells 2002 and 2004 are configured as dual-phase cross-coupled 3:1 Dickson converters to drive the four interleaved multilevel voltage rails $V_1$-$V_4$ with voltage pulses having an amplitude equal to VIN/3.

As shown in FIG. 21, the first switched capacitor output cell 2021 is implemented as a dual-phase switched capacitor converter comprising switches Q11, Q12, Q13, Q14, Q15 and Q16, and capacitors C11, C12 and C13. Each phase leg of the dual-phase switched capacitor converter is connected to a sub-set of output terminals of the first inductor link 2021 as shown in FIG. 21. In operation, the first switched capacitor output cell 2021 is configured to generate $V_{OUT1}$.

The second switched capacitor output cell 2022 is implemented as a single-phase switched capacitor converter comprising switches Q21, Q22 and Q23, and capacitors C21 and C22. The single-phase switched capacitor converter is connected to the second inductor link 2012 at a single node as shown in FIG. 21. In operation, the second switched capacitor output cell 2022 is configured to generate $V_{OUT2}$.

The third switched capacitor output cell 2023 is implemented as a quad-phase switched capacitor converter comprising switches Q31, Q32, Q33, Q34, Q35, Q36, Q37 and Q38, and capacitor C31. Each phase leg of the quad-phase switched capacitor converter is connected to a corresponding output terminal of the third inductor link 2013 as shown in FIG. 21. In operation, the third switched capacitor output cell 2023 is configured to generate $V_{OUT3}$.

In some applications such as chiplet systems, the input switched capacitor cells could be arranged to reside on the motherboard PCB. The inductor link blocks could take a module form to be arranged close to the chiplet dies. The output switched capacitor cells could be either fully integrated with each chiplet die or be separate chips placed close to each chiplet die to which it is supplying power.

Figure 22:
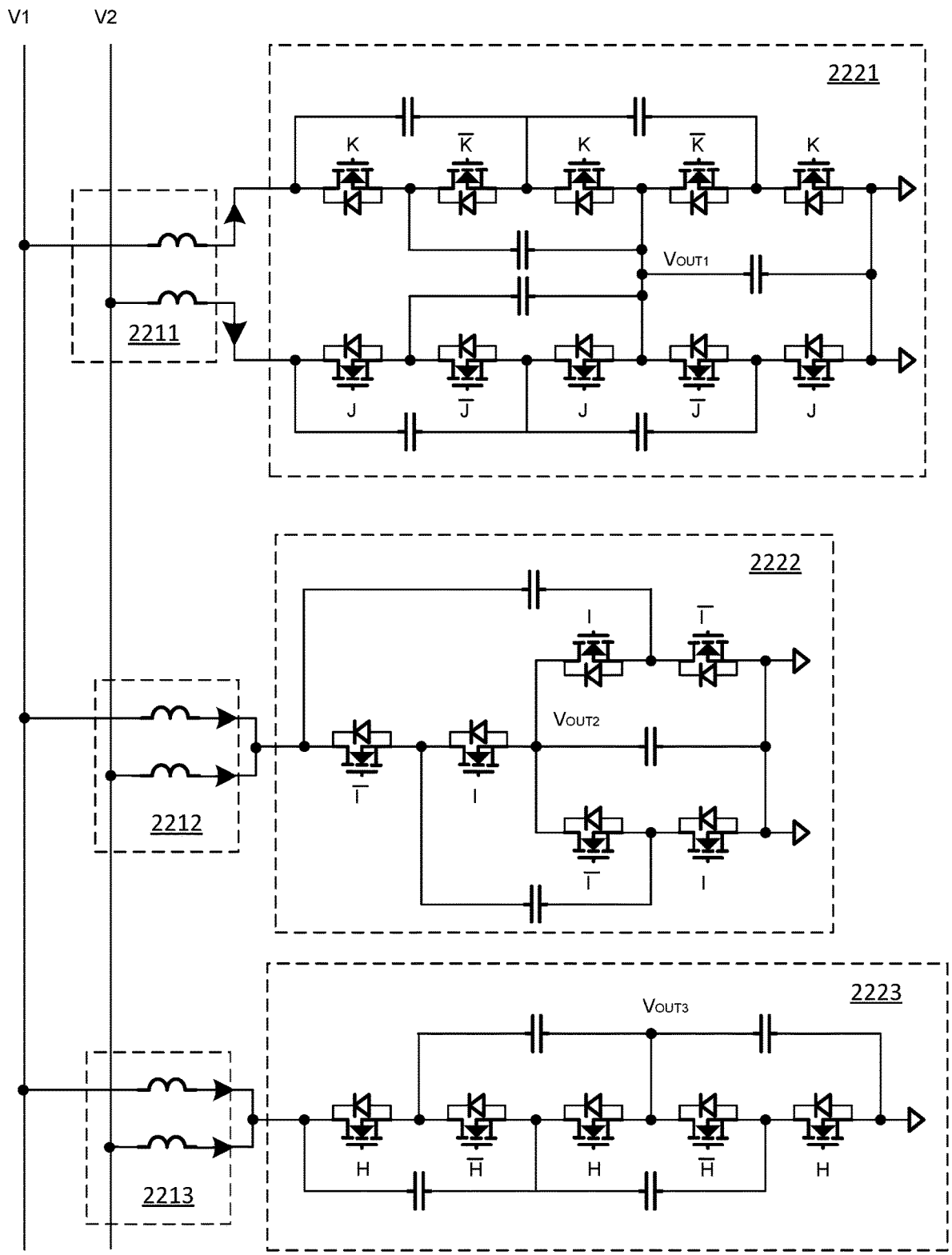
FIG. 22 illustrates a schematic view of another inductor-link power conversion system in accordance with various embodiments of the present disclosure.

FIG. 22 illustrates a schematic view of another inductor-link power conversion system in accordance with various embodiments of the present disclosure. The power conversion system shown in FIG. 22 comprises two interleaved multilevel voltage rails $V_1$ and $V_2$, three inductor links 2211, 2212 and 2213 and three switched capacitor output cells 2221, 2222 and 2223.

The input stage of the inductor-link power conversion system is not included in FIG. 22. Depending on different design needs, the input stage can be implemented as one switched capacitor input cell or a plurality of switched capacitor input cells (e.g., one switched capacitor input cell shown in FIG. 4 or the two switched capacitor input cells shown in FIG. 15).

As shown in FIG. 22, each switched capacitor output cell is connected to all interleaved multilevel voltage rails through coupled or discrete inductors. Each switched capacitor output cell is configured to generate one output voltage. All three configurations shown in FIG. 22 are of a same voltage conversion ratio as follows:

$$\frac{V_O}{V_i} = \frac{1}{(3-D)} \quad (2)$$

In Equation (2), $V_O$ is the output voltage of the switched capacitor output cell. Vi is the DC voltage when directly filtering the interleaved multilevel voltage rails $V_1$ and $V_2$ (this is similar to that shown in FIG. 4 where the inductor link 311 and the output cell 321 are used to directly filter the voltages on the interleaved multilevel voltage rails $V_1$ and $V_2$). D is the duty cycle of control signals H, I, J and K.

Figure 23:
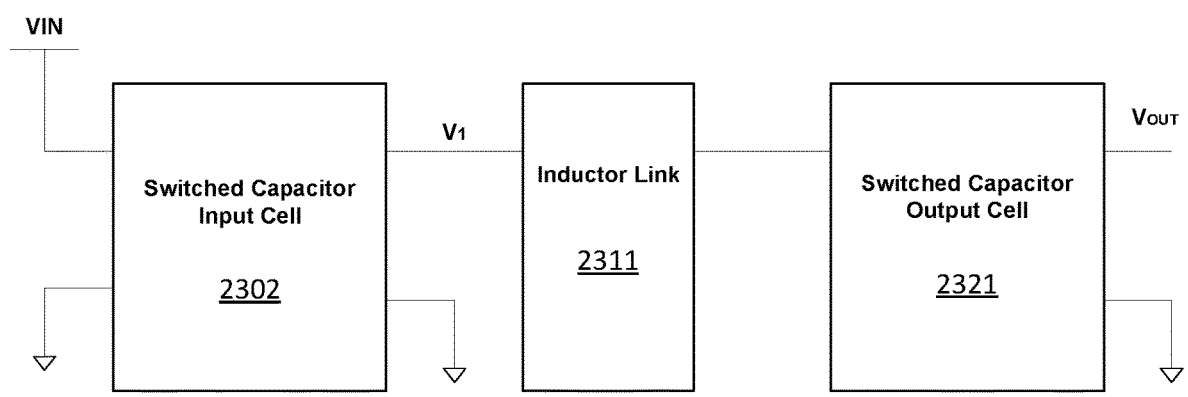
FIG. 23 illustrates a block diagram of another inductor-link power conversion system in accordance with various embodiments of the present disclosure.

FIG. 23 illustrates a block diagram of another inductor-link power conversion system in accordance with various embodiments of the present disclosure. The power conversion system shown in FIG. 23 comprises one switched capacitor input cell 2302. The input of the switched capacitor input cell 2302 is connected to an input voltage source VIN. The switched capacitor input cell 2302 has one output. The output of the switched capacitor input cell 2302 is connected to a voltage rail $V_1$.

The power conversion system shown in FIG. 23 further comprises one inductor link 2311. As shown in FIG. 23, the voltage rail $V_1$ is coupled to the inductor link 2311. As shown in FIG. 23, the power conversion system further comprises one switched capacitor output cells 2321. The switched capacitor output cell 2321 has an input connected to the output of the inductor link 2311.

Figure 24:
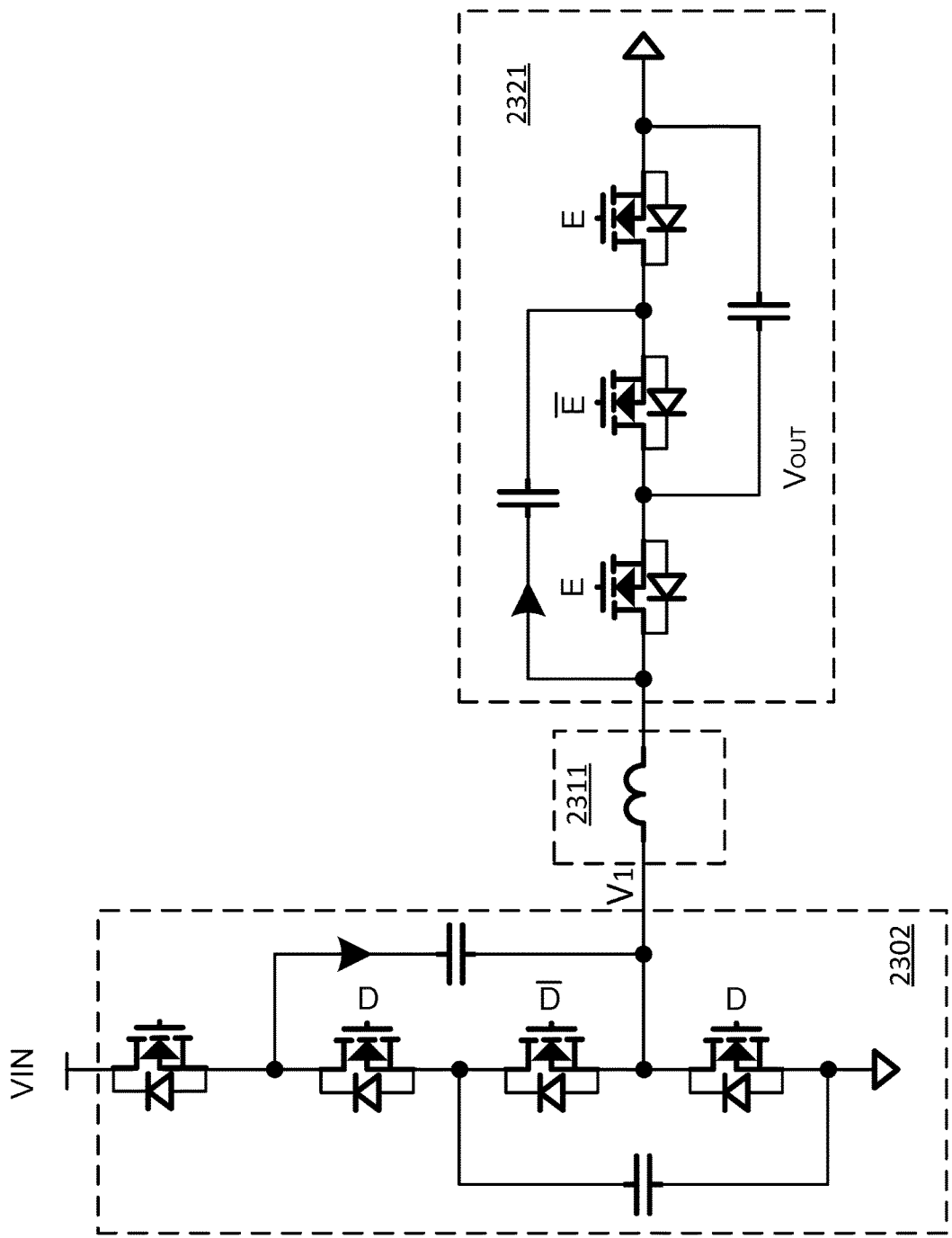
FIG. 24 illustrates a schematic view of the inductor-link power conversion system shown in FIG. 23 in accordance with various embodiments of the present disclosure.

FIG. 24 illustrates a schematic view of the inductor-link power conversion system shown in FIG. 23 in accordance with various embodiments of the present disclosure. The power conversion system shown in FIG. 24 comprises one switched capacitor input cell 2302, one voltage rail $V_1$, one inductor link 2311 and one switched capacitor output cell 2321.

The switched capacitor input cell 2302 comprises four switches and two capacitors as shown in FIG. 24. In operation, the switched capacitor input cell 2302 is configured to covert a voltage VIN (e.g., 12 V) into predetermined lower voltage pulses at $V_1$.

The inductor link 2311 comprises a single inductor winding. The input of the inductor link 2311 is connected to the output of the switched capacitor input cell 2302. The output of the inductor link 2311 is connected to the input of the switched capacitor output cell 2321.

The switched capacitor output cell 2321 comprises three switches and two capacitors. The switched capacitor output cell 2321 is implemented as a single-phase switched capacitor converter. In operation, the switched capacitor output cell 2321 is configured to generate $V_{OUT}$.

Figure 25:
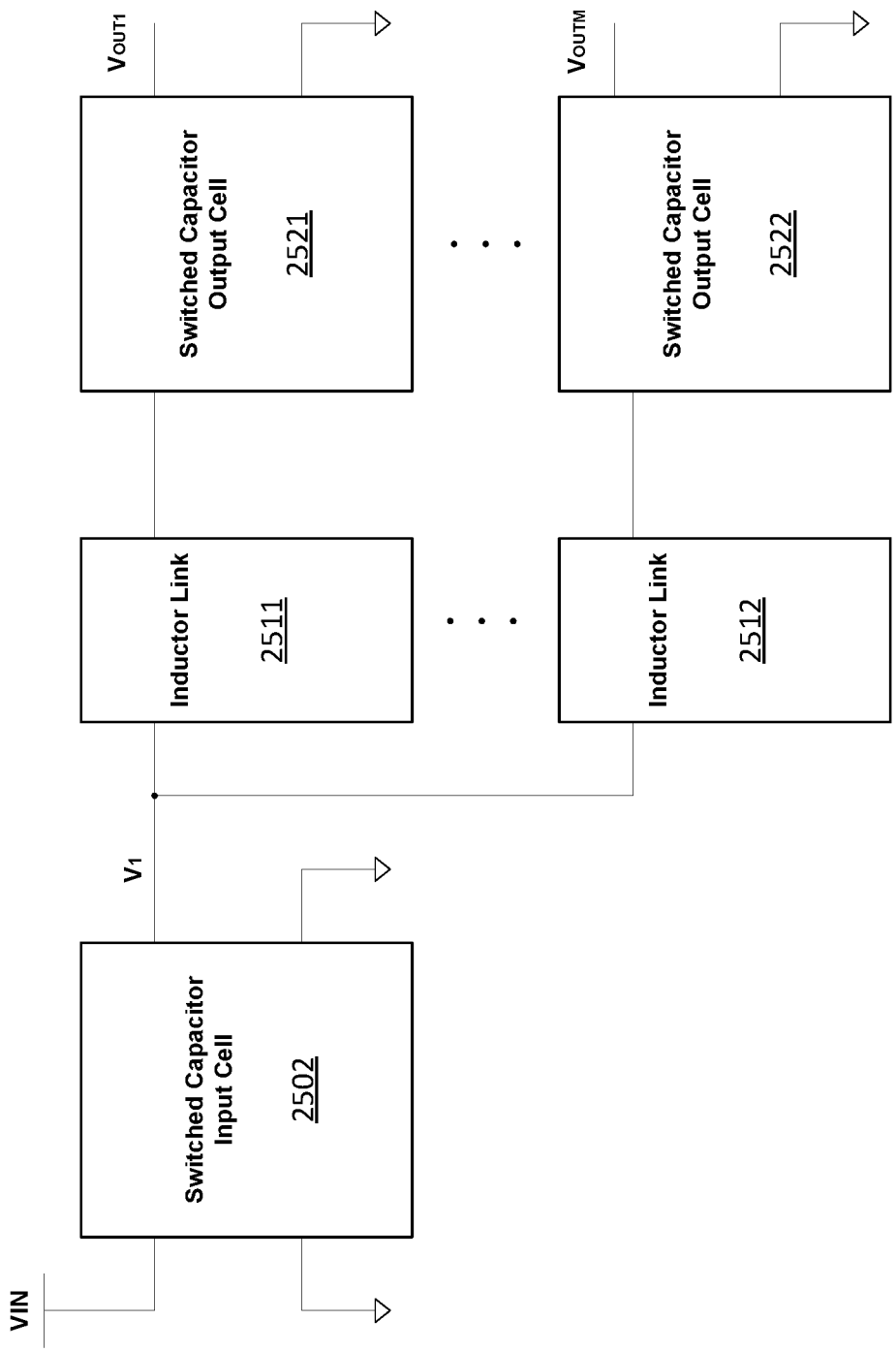
FIG. 25 illustrates a block diagram of another inductor-link power conversion system in accordance with various embodiments of the present disclosure.

FIG. 25 illustrates a block diagram of another inductor-link power conversion system in accordance with various embodiments of the present disclosure. The power conversion system shown in FIG. 25 comprises one switched capacitor input cell 2502. The input of the switched capacitor input cell 2502 is connected to an input voltage source VIN. The switched capacitor input cell 2502 has one output. The output of the switched capacitor input cell 2502 is connected to a voltage rail $V_1$.

The power conversion system shown in FIG. 25 further comprises a plurality of inductor links 2511 and 2512. As shown in FIG. 25, the voltage rail $V_1$ is coupled to the plurality of inductor links 2511 and 2512. As shown in FIG. 25, the power conversion system further comprises a plurality of switched capacitor output cells 2521 and 2522. The inputs of the plurality of switched capacitor output cells 2521 and 2522 are connected to the outputs of the inductor links 2511 and 2512, respectively.

Figure 26:
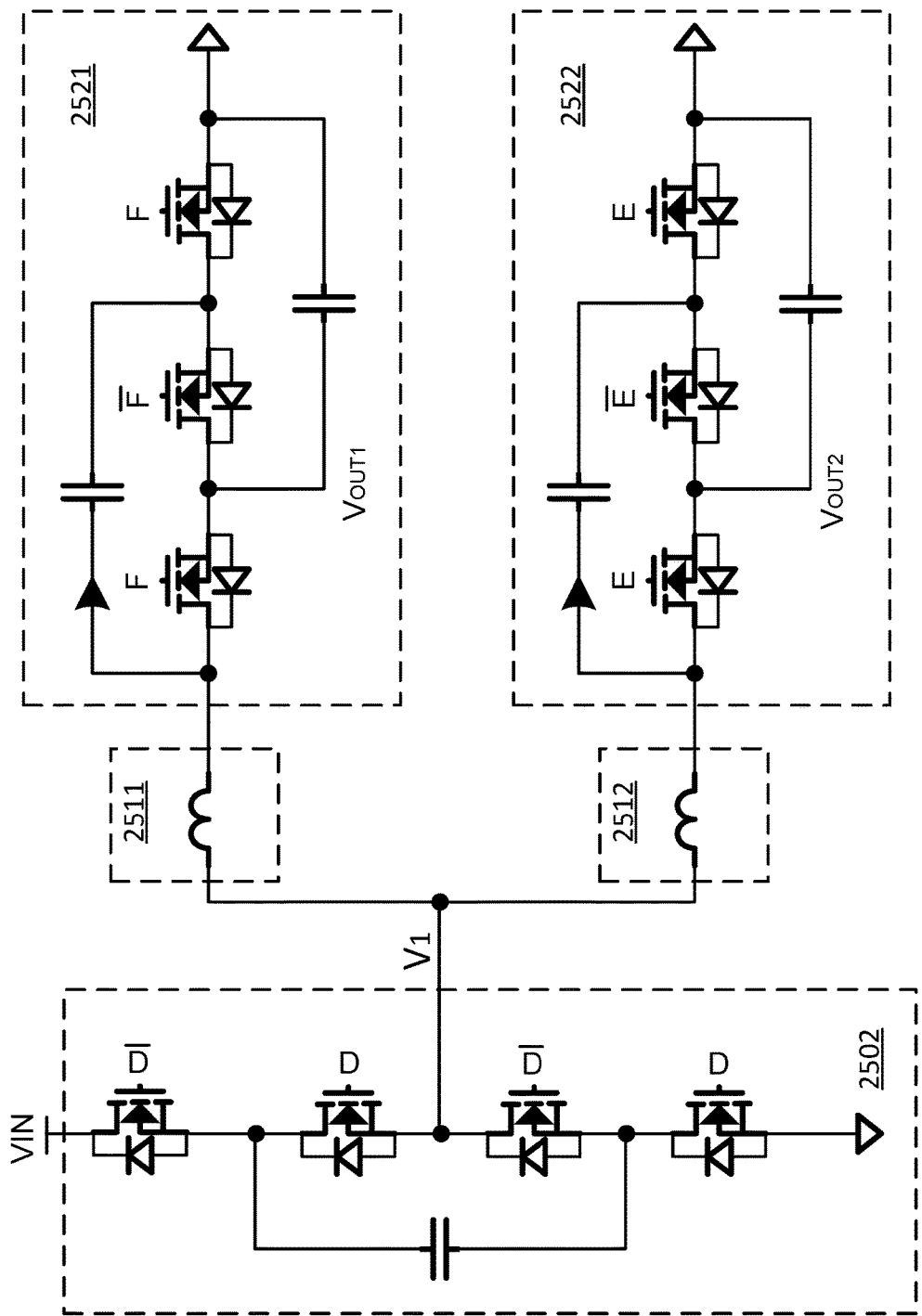
FIG. 26 illustrates a schematic view of an implementation of the inductor-link power conversion system shown in FIG. 25 in accordance with various embodiments of the present disclosure.

FIG. 26 illustrates a schematic view of an implementation of the inductor-link power conversion system shown in FIG. 25 in accordance with various embodiments of the present disclosure. The power conversion system shown in FIG. 26 comprises one switched capacitor input cell 2502, one voltage rail $V_1$, two inductor links 2511 and 2512, and two switched capacitor output cells 2521 and 2522.

The switched capacitor input cell 2502 is configured as a three-level buck converter comprising four switches and one flying capacitor as shown in FIG. 26. In operation, the switched capacitor input cell 2502 is configured to covert a voltage VIN (e.g., 12 V) into lower voltage pulses on $V_1$.

Both inductor links 2511, 2512 comprise one inductor winding. The inputs of the two inductor windings are connected together and further connected to the output of the switched capacitor input cell 2502. The outputs of the two inductor windings are connected to the inputs of a first switched capacitor output cell 2521 and a second switched capacitor output cell 2522, respectively.

The first switched capacitor output cell 2521 comprises three switches and two capacitors. The first switched capacitor output cell 2521 is implemented as a single-phase switched capacitor converter. In operation, the first switched capacitor output cell 2521 is configured to generate $V_{OUT1}$.

The second switched capacitor output cell 2522 comprises three switches and two capacitors. The second switched capacitor output cell 2522 is implemented as a single-phase switched capacitor converter. In operation, the second switched capacitor output cell 2522 is configured to generate $V_{OUT2}$.

Figure 27:
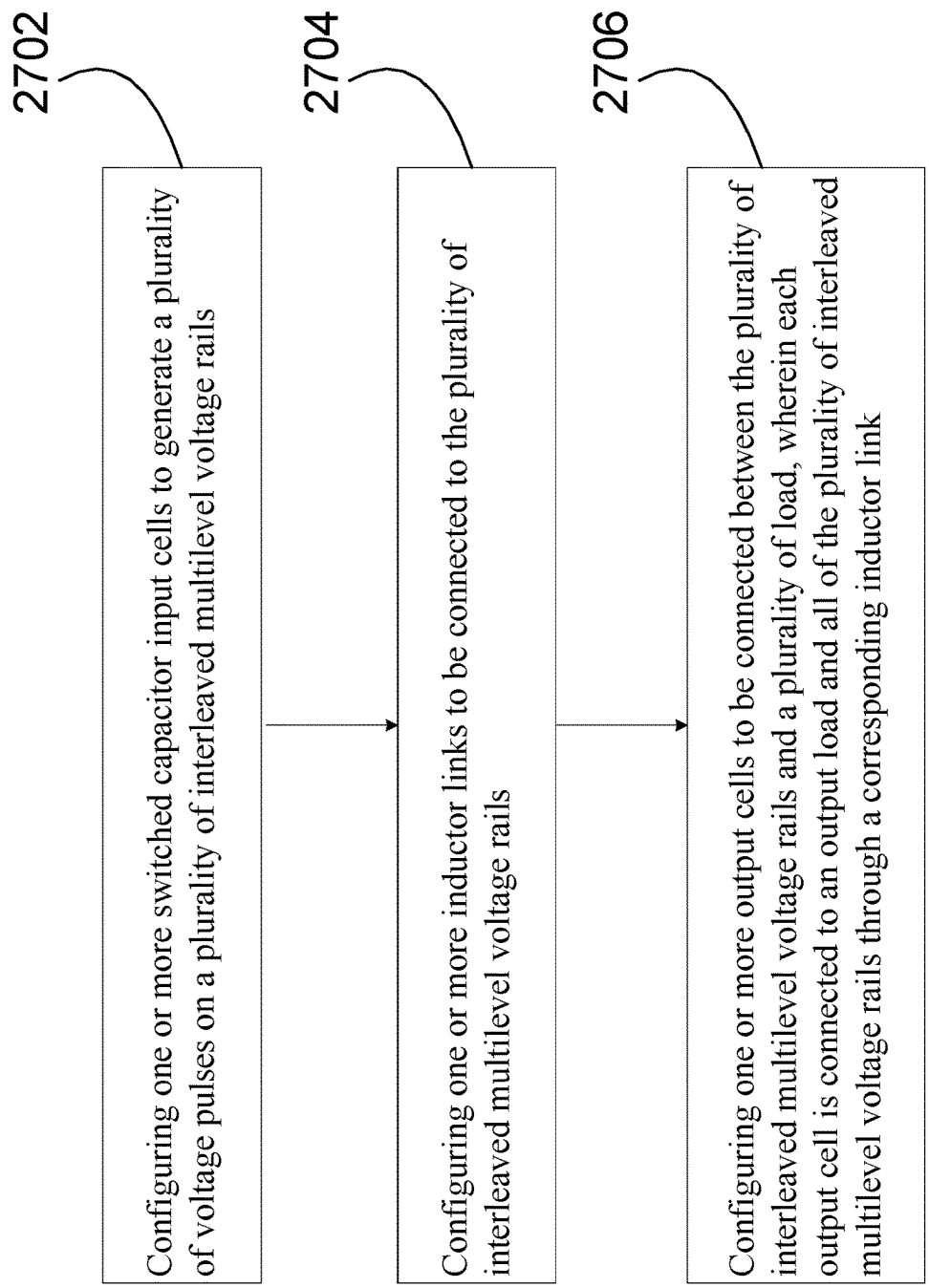
FIG. 27 illustrates a flow chart of a control method for operating the inductor-link power conversion system shown in FIG. 1 in accordance with various embodiments of the present disclosure.

FIG. 27 illustrates a flow chart of a control method for operating the inductor-link power conversion system shown in FIG. 1 in accordance with various embodiments of the present disclosure. This flowchart shown in FIG. 27 is merely an example, which should not unduly limit the scope of the claims. One of ordinary skill in the art would recognize many variations, alternatives, and modifications. For example, various steps illustrated in FIG. 27 may be added, removed, replaced, rearranged and repeated.

Referring back to FIGS. 2 and 3, one or more switched capacitor input cells (e.g., switched capacitor input cell 302) are connected between an input dc source VIN and a plurality of interleaved multilevel voltage rails (e.g., $V_1$). A plurality of inductor links (e.g., inductor link 311) is connected to the plurality of interleaved multilevel voltage rails. One or more output cells (e.g., switched capacitor output cell 321) are connected to the plurality of inductor links. Each output cell is connected to an output load and all of the plurality of interleaved multilevel voltage rails through the plurality of inductor links.

At step 2702, one or more switched capacitor input cells are configured to generate a plurality of voltage pulses on a plurality of interleaved multilevel voltage rails.

At step 2704, one or more inductor links are configured to be connected to the plurality of interleaved multilevel voltage rails.

At step 2706, one or more output cells are configured to be connected between the plurality of interleaved multilevel voltage rails and a plurality of load. Each output cell is connected to an output load and all of the plurality of interleaved multilevel voltage rails through a corresponding inductor link.

The method further comprises configuring the one or more output cells to operate a switching frequency not lower than a switching frequency of the one or more switched capacitor input cells.

The method further comprises configuring one switched capacitor input cell to generate a plurality of first voltage pulses on a first voltage rail of the plurality of interleaved multilevel voltage rails, and configuring the one switched capacitor input cell to generate a plurality of second voltage pulses on a second voltage rail of the plurality of interleaved multilevel voltage rails, wherein in a switching cycle of the one switched capacitor input cell, a first voltage pulse and a second voltage pulse are separated by a 180-degree phase shift.

In some embodiments, at least one inductor link of the one or more inductor links comprises a plurality of inductors magnetically coupled to each other.

The method further comprises configuring each of the plurality of inductors to be connected to a corresponding one of the plurality of interleaved multilevel voltage rails.

A first output cell comprises an output capacitor coupled to the plurality of interleaved multilevel voltage rails through a first inductor link, and wherein the first output cell is configured to generate a first output voltage regulated by a duty cycle of the one or more switched capacitor input cells. A second output cell is a boost converter coupled to the plurality of interleaved multilevel voltage rails through a second inductor link, and wherein the second output cell is configured to generate a second output voltage higher than the first output voltage. A third output cell is a first switched capacitor converter coupled to the plurality of interleaved multilevel voltage rails through a third inductor link, and wherein the third output cell is configured to generate a third output voltage lower than the first output voltage. A fourth output cell is a second switched capacitor converter coupled to the plurality of interleaved multilevel voltage rails through a fourth inductor link, and wherein the fourth output cell is configured to generate a fourth output voltage lower than the first output voltage.

Although embodiments of the present disclosure and its advantages have been described in detail, it should be understood that various changes, substitutions and alterations can be made herein without departing from the spirit and scope of the disclosure as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A power conversion system comprising:
   one or more switched capacitor converters connected between an input dc source and a plurality of interleaved multilevel voltage rails, wherein in a first part of one switching cycle of one switched capacitor converter of the one or more switched capacitor converters, the input dc source is configured to charge at least one flying capacitor through a first group of switches of the one switched capacitor converter, and in a second part of the switching cycle of the one switched capacitor converter, the at least one flying capacitor is configured to provide power for at least one of the plurality of interleaved multilevel voltage rails through a second group of switches of the one switched capacitor converter;
   one or more inductor links connected to the plurality of interleaved multilevel voltage rails; and one or more output cells, wherein each output cell is connected to an output load and all of the plurality of interleaved multilevel voltage rails through a corresponding inductor link.

2. The power conversion system of claim 1, wherein:
one inductor link of the one or more inductor links comprises a plurality of inductors magnetically coupled to each other.

3. The power conversion system of claim 1, wherein:
one inductor link of the one or more inductor links comprises two separate inductors.

4. The power conversion system of claim 1, wherein:
switches of the one or more output cells are configured to operate at a frequency not lower than a switching frequency of switches of the switched capacitor converters.

5. The power conversion system of claim 1, wherein:
at least one output cell of the one or more output cells is a switched capacitor output cell.

6. The power conversion system of claim 1, wherein:
the number of phase legs of one output cell is equal to the number of the plurality of interleaved multilevel voltage rails, and wherein each phase leg of the one or more output cells is coupled to a corresponding rail of the plurality of interleaved multilevel voltage rails.

7. The power conversion system of claim 1, wherein:
the number of phase legs of one switched capacitor output cell is less than the number of the plurality of interleaved multilevel voltage rails, and wherein each phase leg of the one or more output cells is coupled to more than one rail of the plurality of interleaved multilevel voltage rails.

8. The power conversion system of claim 1, wherein:
the one or more output cells are connected to a same output load.

9. The power conversion system of claim 1, wherein:
one switched capacitor converter is connected to a subset of the plurality of interleaved multilevel voltage rails.

10. A method comprising:
configuring one or more switched capacitor converters to generate a plurality of voltage pulses on a plurality of interleaved multilevel voltage rails, wherein in a first part of one switching cycle of one switched capacitor converter of the one or more switched capacitor converters, an input dc source is configured to charge at least one flying capacitor through a first group of switches of the one switched capacitor converter, and in a second part of the switching cycle of the one switched capacitor converter, the at least one flying capacitor is configured to provide power for at least one of the plurality of interleaved multilevel voltage rails through a second group of switches of the one switched capacitor converter;
configuring one or more inductor links to be connected to the plurality of interleaved multilevel voltage rails; and
configuring one or more output cells to be connected between the plurality of interleaved multilevel voltage rails and a plurality of load, wherein each output cell is connected to an output load and all of the plurality of interleaved multilevel voltage rails through a corresponding inductor link.

11. The method of claim 10, further comprising:
configuring the one or more output cells to operate a switching frequency not lower than a switching frequency of the one or more switched capacitor converters.

12. The method of claim 10, further comprising:
configuring one switched capacitor converter to generate a plurality of first voltage pulses on a first voltage rail of the plurality of interleaved multilevel voltage rails; and
configuring the one switched capacitor converter to generate a plurality of second voltage pulses on a second voltage rail of the plurality of interleaved multilevel voltage rails, wherein in a switching cycle of the one switched capacitor converter, a first voltage pulse and a second voltage pulse are separated by a 180-degree phase shift.

13. The method of claim 10, wherein:
at least one inductor link of the one or more inductor links comprises a plurality of inductors magnetically coupled to each other.

14. The method of claim 13, wherein:
configuring each of the plurality of inductors to be connected to a corresponding one of the plurality of interleaved multilevel voltage rails.

15. The method of claim 10, wherein:
at least one output cell of the one or more output cells is a switched capacitor output cell.

16. A system comprising:
one or more input cells connected to an input dc source and one or more interleaved multilevel voltage rails;
one or more inductor links connected to the one or more interleaved multilevel voltage rails; and
one or more switched capacitor converters, wherein each switched capacitor converter is connected to an output load and all of the one or more interleaved multilevel voltage rails through the one or more inductor links, wherein in a first part of one switching cycle of one switched capacitor converter of the one or more switched capacitor converters, an inductor link is configured to charge at least one flying capacitor through a first group of switches of the one switched capacitor converter, and in a second part of the one switching cycle of the one switched capacitor converter, the at least one flying capacitor is configured to provide power for a corresponding load through a second group of switches of the one switched capacitor converter.

17. The system of claim 16, wherein:
the one or more input cells is a first switched capacitor converter;
the one or more inductor links is a single inductor; and
the one or more switched capacitor converters is a second switched capacitor converter, wherein the single inductor is connected between an output of the first switched capacitor converter and an input of the second switched capacitor converter.

18. The system of claim 16, wherein:
the one or more input cells is a first switched capacitor converter;
the one or more inductor links comprise a first inductor and a second inductor; and
the one or more switched capacitor converters comprise a second switched capacitor converter and a third switched capacitor converter, and wherein the second switched capacitor converter is connected to the first switched capacitor converter through the first inductor, and the third switched capacitor converter is connected to the first switched capacitor converter through the second inductor.

19. The system of claim 16, wherein:
the one or more interleaved multilevel voltage rails comprises a first voltage rail and a second voltage rail, and wherein the one or more input cells are configured to generate a plurality of first voltage pulses on the first voltage rail and a plurality of second voltage pulses on the second voltage rail, and wherein in a switching cycle of the one or more input cells, a first voltage pulse and a second voltage pulse are separated by a 180-degree phase shift.

20. The system of claim 16, wherein:
the one or more interleaved multilevel voltage rails comprises M voltage rails, and wherein the one or more input cells are configured to generate a plurality of voltage pulses on each voltage rails of the M voltage rails, and wherein in a switching cycle, two adjacent voltage pulse are separated by a (360/M)-degree phase shift.

* * * * *